US008938743B2

(12) United States Patent
Murtagh

(10) Patent No.: US 8,938,743 B2
(45) Date of Patent: Jan. 20, 2015

(54) METHODS AND SYSTEMS FOR PROVIDING, TO A FIRST APPLICATION EXECUTED BY A FIRST OPERATING SYSTEM, AN INTERFACE FOR COMMUNICATING WITH AT LEAST ONE APPLICATION EXECUTED BY A SECOND OPERATING SYSTEM

(75) Inventor: Richard Leo Murtagh, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1244 days.

(21) Appl. No.: 12/341,797

(22) Filed: Dec. 22, 2008

(65) Prior Publication Data

US 2009/0183186 A1 Jul. 16, 2009

Related U.S. Application Data

(60) Provisional application No. 61/016,025, filed on Dec. 21, 2007.

(51) Int. Cl.
*G06F 3/00* (2006.01)
*G06F 9/44* (2006.01)
*G06F 9/46* (2006.01)
*G06F 13/00* (2006.01)

(52) U.S. Cl.
CPC .................................... *G06F 9/4443* (2013.01)
USPC ........................................................ 719/329

(58) Field of Classification Search
None
See application file for complete search history.

(56) References Cited

U.S. PATENT DOCUMENTS 5,375,200 A   12/1994  Dugan et al.
5,408,261 A   4/1995   Kamata et al.
5,408,659 A * 4/1995   Cavendish et al. ............ 717/107
5,446,902 A * 8/1995   Islam ............................. 717/116
5,522,025 A   5/1996   Rosenstein
5,668,997 A   9/1997   Lynch-Freshner et al.

(Continued)

FOREIGN PATENT DOCUMENTS

WO       WO-97/13352        4/1997

OTHER PUBLICATIONS

Australian Examination Report on 2007307915 dated Aug. 5, 2011.

(Continued)

*Primary Examiner* — H S Sough
*Assistant Examiner* — William C Wood
(74) *Attorney, Agent, or Firm* — Foley & Lardner LLP; Christopher J. McKenna; James M. White

(57) ABSTRACT

A method for providing, to a first application executed by a first operating system, an interface for communicating with at least one application executed by a second operating system includes providing, by a first interface object executed by the first operating system, a mechanism for external communication with a first application executed by the first operating system. A second interface object executed by the second operating system provides a mechanism for external communication with a window handler executed by the second operating system. The first interface object receives an identification of a window displayed by the first operating system and generated by a second application executed by the second operating system and requests, from the second interface object, analysis of the identified window. The first interface object receives, from the second interface object, an identification of contact information displayed by the window resulting from the analysis by the window handler.

20 Claims, 16 Drawing Sheets

(56) References Cited

U.S. PATENT DOCUMENTS

| | | | |
|---|---|---|---|
| 6,040,832 A | 3/2000 | Poreh et al. | |
| 6,262,735 B1 | 7/2001 | Etelapera | |
| 6,285,364 B1 | 9/2001 | Giordano et al. | |
| 6,363,065 B1 | 3/2002 | Thornton et al. | |
| 6,427,233 B1 | 7/2002 | Lee et al. | |
| 6,750,858 B1 | 6/2004 | Rosenstein | |
| 6,859,928 B2 | 2/2005 | Wright | |
| 6,980,641 B1* | 12/2005 | Stanford et al. | 379/354 |
| 7,003,327 B1 | 2/2006 | Payne et al. | |
| 7,019,757 B2 | 3/2006 | Brown et al. | |
| 7,221,748 B1 | 5/2007 | Moore et al. | |
| 7,333,976 B1 | 2/2008 | Auerbach et al. | |
| 7,441,181 B2 | 10/2008 | Yamada et al. | |
| 7,451,406 B2 | 11/2008 | Yoon | |
| 7,600,267 B2 | 10/2009 | Bauchot et al. | |
| 7,720,207 B2 | 5/2010 | Stanford et al. | |
| 7,895,209 B2 | 2/2011 | Spence et al. | |
| 2001/0002124 A1* | 5/2001 | Mamiya et al. | 345/132 |
| 2001/0005382 A1 | 6/2001 | Cave et al. | |
| 2001/0018715 A1 | 8/2001 | Stern et al. | |
| 2002/0007374 A1 | 1/2002 | Marks et al. | |
| 2002/0054671 A1 | 5/2002 | Wiener et al. | |
| 2002/0118231 A1 | 8/2002 | Smith et al. | |
| 2002/0130880 A1 | 9/2002 | Holtslag et al. | |
| 2002/0136206 A1 | 9/2002 | Gallant et al. | |
| 2002/0137490 A1 | 9/2002 | Gallant | |
| 2002/0167946 A1 | 11/2002 | Gallant | |
| 2003/0058266 A1 | 3/2003 | Dunlap et al. | |
| 2003/0058858 A1 | 3/2003 | Berlyoung et al. | |
| 2003/0074647 A1 | 4/2003 | Andrew | |
| 2003/0095542 A1 | 5/2003 | Chang et al. | |
| 2003/0142108 A1 | 7/2003 | Brown et al. | |
| 2003/0165140 A1 | 9/2003 | Tang et al. | |
| 2004/0095401 A1 | 5/2004 | Tomimori | |
| 2004/0165713 A1 | 8/2004 | Leighton | |
| 2004/0239701 A1 | 12/2004 | Crichton | |
| 2005/0057498 A1 | 3/2005 | Gentle | |
| 2005/0117737 A1 | 6/2005 | Stanford et al. | |
| 2005/0125543 A1 | 6/2005 | Park et al. | |
| 2005/0278626 A1 | 12/2005 | Malik | |
| 2006/0026288 A1 | 2/2006 | Acharya et al. | |
| 2006/0048073 A1 | 3/2006 | Jarrett et al. | |
| 2006/0095397 A1* | 5/2006 | Torres et al. | 707/1 |
| 2006/0184410 A1* | 8/2006 | Ramamurthy et al. | 705/8 |
| 2006/0224989 A1 | 10/2006 | Pettiross et al. | |
| 2007/0021981 A1* | 1/2007 | Cox | 705/2 |
| 2007/0030245 A1 | 2/2007 | Ngari et al. | |
| 2007/0143414 A1 | 6/2007 | Daigle | |
| 2007/0201493 A1 | 8/2007 | Yamada et al. | |
| 2007/0233891 A1 | 10/2007 | Luby et al. | |
| 2007/0253643 A1* | 11/2007 | Nagarajan | 382/305 |
| 2008/0031228 A1 | 2/2008 | Gallant | |
| 2008/0059646 A1 | 3/2008 | Ludvig et al. | |
| 2008/0081662 A1* | 4/2008 | Strandell et al. | 455/557 |
| 2008/0256563 A1 | 10/2008 | Han | |
| 2008/0276267 A1 | 11/2008 | Badt et al. | |
| 2008/0281971 A1 | 11/2008 | Leppanen et al. | |
| 2008/0313669 A1 | 12/2008 | Acharya et al. | |
| 2009/0022283 A1 | 1/2009 | Pollitt | |
| 2009/0025042 A1 | 1/2009 | Lubbers et al. | |
| 2009/0049392 A1 | 2/2009 | Karttunen et al. | |
| 2009/0201990 A1 | 8/2009 | Leprovost et al. | |
| 2009/0238174 A1 | 9/2009 | Veenstra et al. | |
| 2009/0265746 A1 | 10/2009 | Halen et al. | |
| 2009/0268720 A1 | 10/2009 | Veenstra et al. | |
| 2010/0141552 A1 | 6/2010 | Ferlitsch et al. | |

OTHER PUBLICATIONS

Australian Examination Report on 2008289047 dated Apr. 18, 2011.
Bobola, Daniel T., "The Complete Idiot's Guide to Microsoft Word 2000", 1999, pp. 15, 121, 166, 244, 278-281.
Non Final Office Action regarding U.S. Appl. No. 11/539,515 mailed on Jul. 13, 2011.
US Non Final Office Action regarding U.S. Appl. No. 11/843,509 mailed on Nov. 23, 2010.
Final Office Action regarding U.S. Appl. No. 11/853,510 mailed on Nov. 26, 2010.
Non Final Office Action regarding U.S. Appl. No. 11/843,513 dated Jun. 22, 2011.
Final Office Action regarding U.S. Appl. No. 12/174,881 mailed on Nov. 24, 2010.
International Search Report from PCT/US2008/073586, dated Nov. 18, 2008, 4 pages.
Office Action on U.S. Appl. No. 11/539,515 dated Dec. 20, 2011.
Office Action on U.S. Appl. No. 11/843,514 dated May 11, 2011.
Office Action on U.S. Appl. No. 11/843,516 dated Mar. 18, 2011.
Office Action on U.S. Appl. No. 11/843,516 dated Nov. 7, 2011.
Office Action on U.S. Appl. No. 12/341,779 dated Aug. 2, 2011.
Office Action on U.S. Appl. No. 12/341,809 dated Aug. 3, 2011.
Office Action on U.S. Appl. No. 12/341,919 dated Oct. 11, 2011.
Written Opinion of the International Searching Authority, from PCT/US2008/073586, dated Nov. 18, 2008, 7 pages.

* cited by examiner

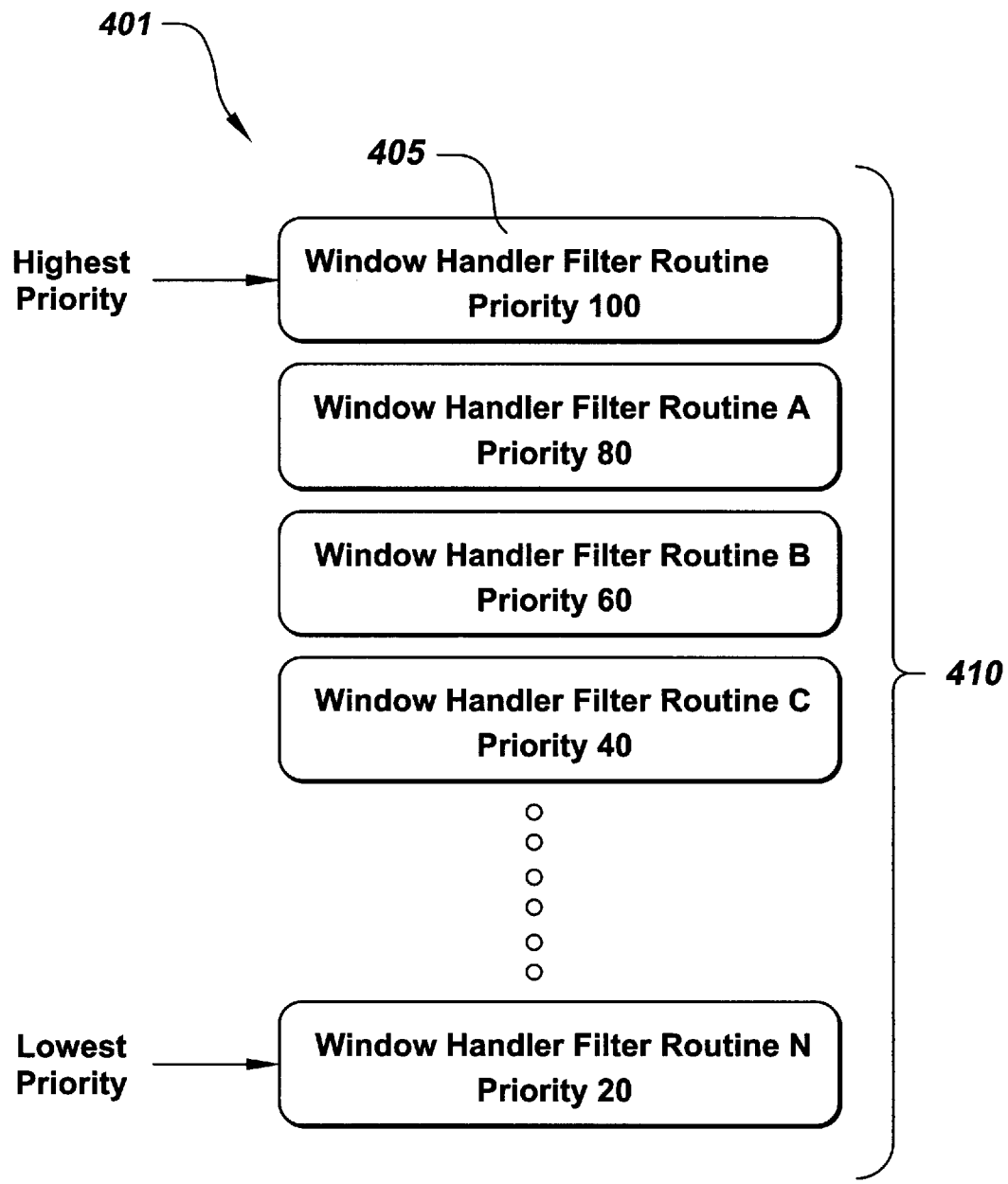

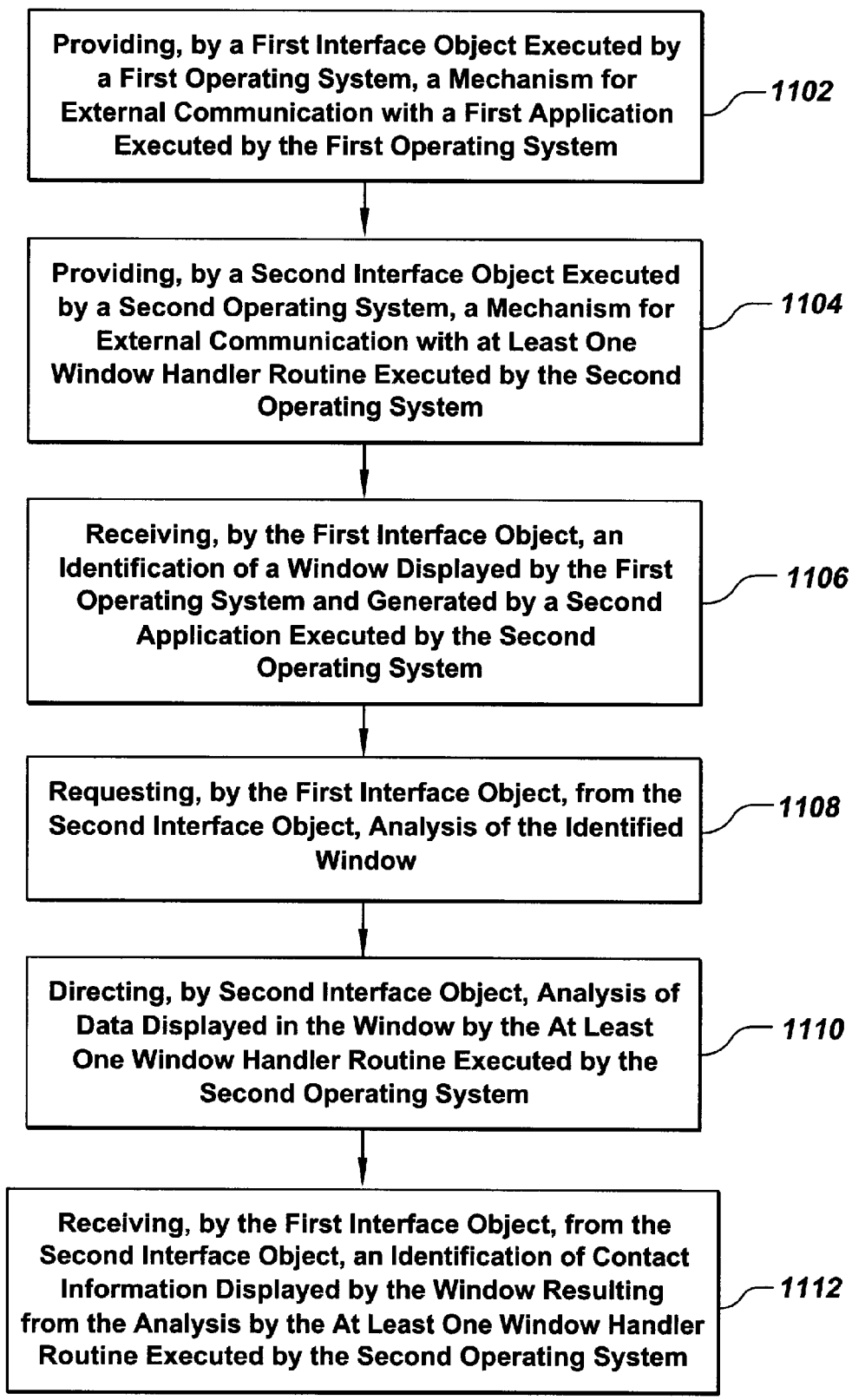

METHODS AND SYSTEMS FOR PROVIDING, TO A FIRST APPLICATION EXECUTED BY A FIRST OPERATING SYSTEM, AN INTERFACE FOR COMMUNICATING WITH AT LEAST ONE APPLICATION EXECUTED BY A SECOND OPERATING SYSTEM

RELATED APPLICATION

The present application claims priority to U.S. Provisional Patent Application Ser. No. 61/016,025, entitled "Systems and Methods for Obtaining Communications Data," filed Dec. 21, 2007, which is incorporated herein by reference.

FIELD OF THE INVENTION

This disclosure relates generally to providing interfaces between remotely-executing applications. In particular, this disclosure relates to systems and methods for providing, to a first application executed by a first operating system, an interface for communicating with at least one application executed by a second operating system.

BACKGROUND OF THE INVENTION

Prior efforts have been made to provide a system and method that allows end-users to establish communication sessions from a computing device. These systems and methods include those that establish and facilitate communication via a communication application dedicated to the task of managing the communication, and those that establish communications using a website with phone numbers, a web server, and a dialing application. Still other systems and methods include those that retrieve phone numbers from application output data within a window and further use the retrieved phone numbers to establish communications via a communication agent. In such systems and methods, each window displayed on a particular display device is searched for text string sequences similar to those of a phone number, regardless of whether or not the window is likely to contain contact information. Alternatively, if a window is generated by an application executing on a remote machine but displayed on the computing device, conventional systems do not typically provide functionality for analyzing the remotely-generated window for contact data.

SUMMARY OF THE INVENTION

In one aspect, a method for providing, to a first application executed by a first operating system, an interface for communicating with at least one application executed by a second operating system includes providing, by a first interface object executed by a first operating system, a mechanism for external communication with a first application executed by the first operating system. The method includes providing, by a second interface object executed by a second operating system, a mechanism for external communication with at least one window handler routine executed by the second operating system. The method includes receiving, by the first interface object, an identification of a window displayed by the first operating system and generated by a second application executed by the second operating system. The method includes requesting, by the first interface object, from the second interface object, analysis of the identified window. The method includes directing, by second interface object, analysis of data displayed in the window by the at least one window handler routine. The method includes receiving, by the first interface object, from the second interface object, an identification of contact information displayed by the window resulting from the analysis by the at least one window handler routine.

In one aspect, a system for providing, to a first application executed by a first operating system, an interface for communicating with at least one application executed by a second operating system includes a first interface object, at least one window handler routine, and a second interface object. The first interface object executed by a first operating system, provides a mechanism for external communication with a first application executed by the first operating system, and receives an identification of a window displayed by the first operating system and generated by a second application executed by a second operating system. The at least one window handler routine executed by the second operating system includes a receiver, an analysis engine, and a transmitter. The at least one window handler receives a request from the first interface object via a second interface object executed by the second operating system and providing a mechanism for external communication with the at least one window handler routine. The at least one window handler analyzes data displayed in the window. The at least one window handler transmits to the first interface object via the second interface object an identification of contact information displayed by the window.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4A is a block diagram depicting one embodiment of a plurality of window handler routines;

FIG. 11 is a flow diagram depicting one embodiment of a method for providing, to a first application executed by a first operating system, an interface for communicating with at least one application executed by a second operating system.

DETAILED DESCRIPTION

Figure 1:
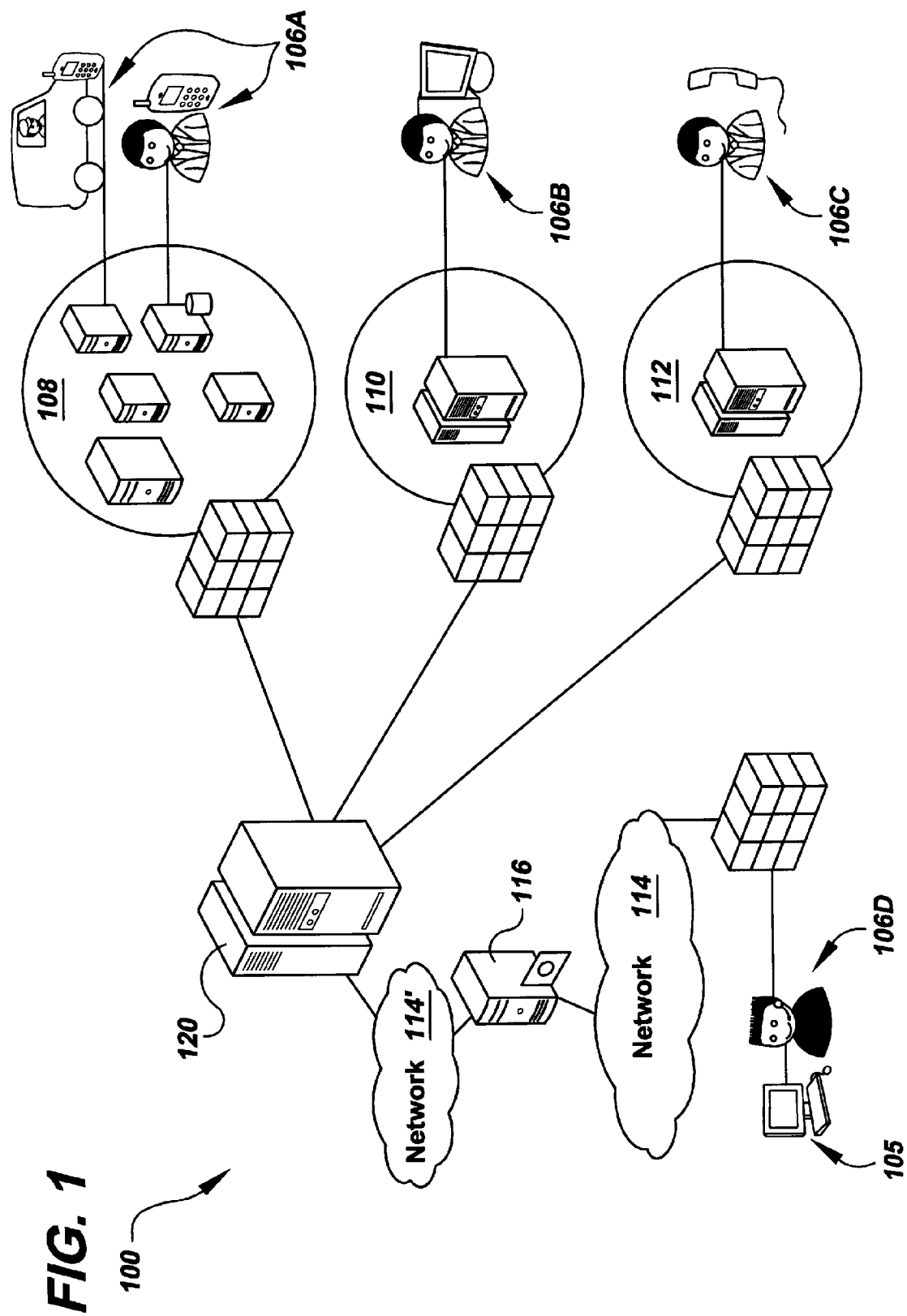
FIG. 1 is a block diagram depicting one embodiment of an environment for providing communications.

Referring now to FIG. 1, a block diagram depicts one embodiment of an environment 100 for providing voice communication (e.g., a voice call). The environment 100 includes a plurality of end-users 106A, 106B, 106C, 106D (generally referred to end-user 106) that communicate using one or more of: a mobile network 108, a packet-switched network 110, and a circuit-switched network 112. One of the end-users 106 is in communication with a communication gateway 116 via at least one network 114. The communications gateway 116 is in communication with a private branch exchange (PBX) 120. The PBX 120 is in communications with one or more of the mobile network 108, the packet-switched network 110, and the circuit-switched network 112. The communications gateway 116 and the PBX 120 may communicate with each other via a second network 114'. In one embodiment, the first network 114 and the second network 114' are the same network. The second network 114' can include one or more of each of a QSIG trunk, an H.323 trunk, and a SIP trunk. QSIG refers to the ISDN based signaling protocol for signaling between nodes of a Private Integrated Services Network (PISN). The QSIG protocol carries user and feature information between private branch exchanges. H.323 refers to the ITU standard that defines a framework of protocols for inter-working voice, video and data across an IP network. SIP refers to the Session Initiation Protocol, which is used for setting up communications sessions on the Internet, such as telephony, presence, events notification and instant messaging. The SIP protocol initiates call setup, routing, authentication and other feature messages to endpoints within an IP domain.

Each end-user 106 can have a computing device 105 executing software that provides at least some of the below-described functionality. The end-user 106 interacts with the computing device 105 to cause the computing device 105 to, for example, issue commands to the communications gateway 116, which in turn issues commands to the PBX 120, to establish a voice communication session with at least one other end-user 106.

The first network 114 and the second network 114' can be a local-area network (LAN), a metropolitan-area network (MAN), or a wide area network (WAN) such as the Internet or the World Wide Web. In one embodiment, a network 114 may be a private network and a network 114' may be a public network. In another of these embodiments, a network 114' may be a private network and a network 114 a public network. In still another embodiment, networks 114 and 114' may both be private networks. In yet another embodiment, networks 114 and 114' may both be public networks.

The network 114 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 114 may comprise a wireless link, such as an infrared channel or satellite band. The topology of the network 114 may be a bus, star, or ring network topology. The network 114 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers. For example, the communications gateway 116, the PBX 120, and machines in the mobile network 108, the packet-switched network 110, or the circuit-switched network 112 may be provided as one or more servers. In some embodiments, a logical group of servers may be referred to as a server farm. In some of these embodiments, the servers may be geographically dispersed. In others of these embodiments, a farm may be administered as a single entity. In still others of these embodiments, the server farm comprises a plurality of server farms. In further embodiments, the server farm executes one or more applications on behalf of one or more end-users 106. A server may be a file server, application server, web server, proxy server, appliance, network appliance, gateway, application gateway, gateway server, virtualization server, deployment server, SSL VPN server, or firewall. In some embodiments, a server provides a remote authentication dial-in user service, and is referred to as a RADIUS server. In other embodiments, a server may have the capacity to function as either an application server or as a master application server. In still other embodiments, a server is a blade server. In yet other embodiments, a server executes a virtual machine providing, to a user or computing device 105, access to a computing environment.

In one embodiment, a server may include an Active Directory. The server may be an application acceleration appliance. For embodiments in which the server is an application acceleration appliance, the server may provide functionality including firewall functionality, application firewall functionality, or load balancing functionality. In some embodiments, the server comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The computing device 105 connects to the network 114 via communications link using any one of a variety of connections including, but not limited to, standard telephone lines, LAN or WAN links (e.g., T1, T3, 56 kb, X.25), broadband connections (ISDN, Frame Relay, ATM), and wireless connections. In some embodiments, the computing device 105 of the end-user 106 connects to the communications gateway 116 through an additional network (not shown) using another communication link that connects the network 114 to the additional network. The protocols used to communicate through the communications link can include any variety of protocols used for long haul or short transmission. For example, TCP/IP, IPX, SPX, NetBIOS, NetBEUI, SONET and SDH protocols or any type and form of transport control protocol may also be used, such as a modified transport control protocol, for example a Transaction TCP (T/TCP), TCP with selection acknowledgements (TCPSACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used. The combination of the networks 114 can be conceptually thought of as the Internet. As used herein, Internet refers to the electronic communications network that connects computer networks and organizational computer facilities around the world.

The packet switched network 110 communicates, directly or indirectly, with the PBX 120. As used herein, a packet switched network refers to a data communications network where information (e.g., voice and data) is divided into packets and delivered to their destination separately and possibly via different paths. Some packet switched networks provide voice-IP (VoIP) functionality. The PBX 120 can provide telephone services to end-users 106 having telephone devices terminated on the packet switched network 110. As used herein, telephone devices refers telephones, fax machines, computers, IP phones, soft phones, video phones, mobile phones, wlan phones, or other devices capable of transmitting and receiving audible information.

The circuit switched network 112 also communicates, directly or indirectly, with the PBX 120. As used herein circuit switched refers to routing traffic between an originator and a destination through switching centers, from local users or from other switching centers, whereby a continuous electrical circuit is established and maintained between the calling and called stations until it is released by one of those stations. For example, the switched circuit network 112 can be the public switched telephone network (PSTN). The PBX 120 can provide telephone services to end-users 106 having telephone devices terminated on the circuit switched network 112.

The mobile network 108 communicates, directly or indirectly, with the PBX 120. As used herein, mobile network refers to facilities operated by a telephony carrier for the purposes of providing public mobile telecommunications services. The PBX 120 can provide telephone services to enterprise subscribers having telephone devices terminated on the mobile switched network 108.

As an operational summary, the PBX 120 interfaces to one or more of the mobile network 108, the packet switched network 110, and the circuit switched network 112 and to the communications gateway 116. An end-user 106 initiates a request for a communications session with another end-user 106. In response, the computing device 105 of the end-user 106 issues a signal (e.g., a command) to the communications gateway 116. In response, the communications gateway 106 establishes communications with the PBX 120 and issues a signal (e.g., a command) to the PBX to establish a communications session between the end-users 106. In such an embodiment, the communications session is established and "hosted" by the PBX 120.

Figure 2A:
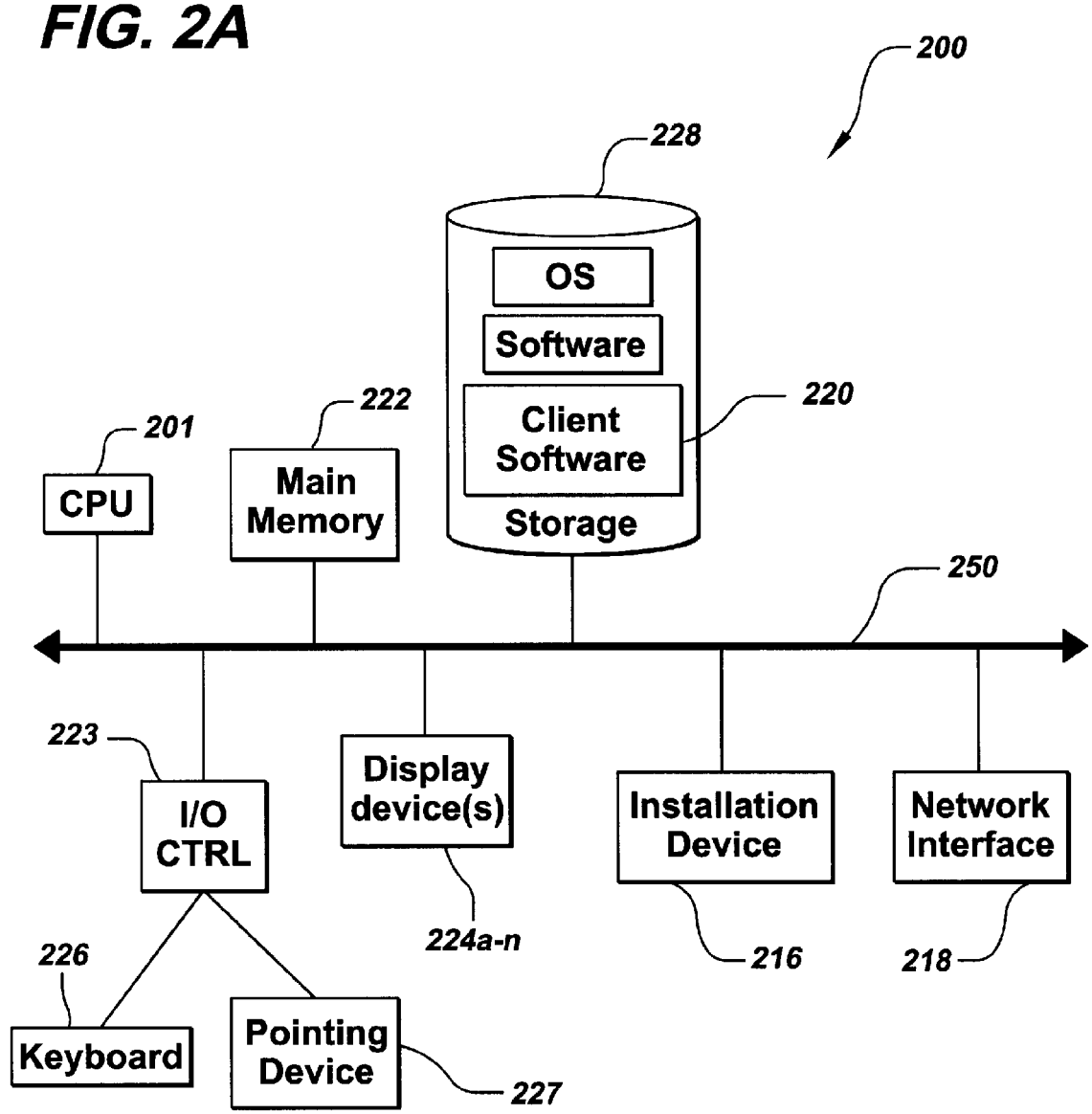
FIGS. 2A and 2B are block diagrams of embodiments of a computing device.
Figure 2B:
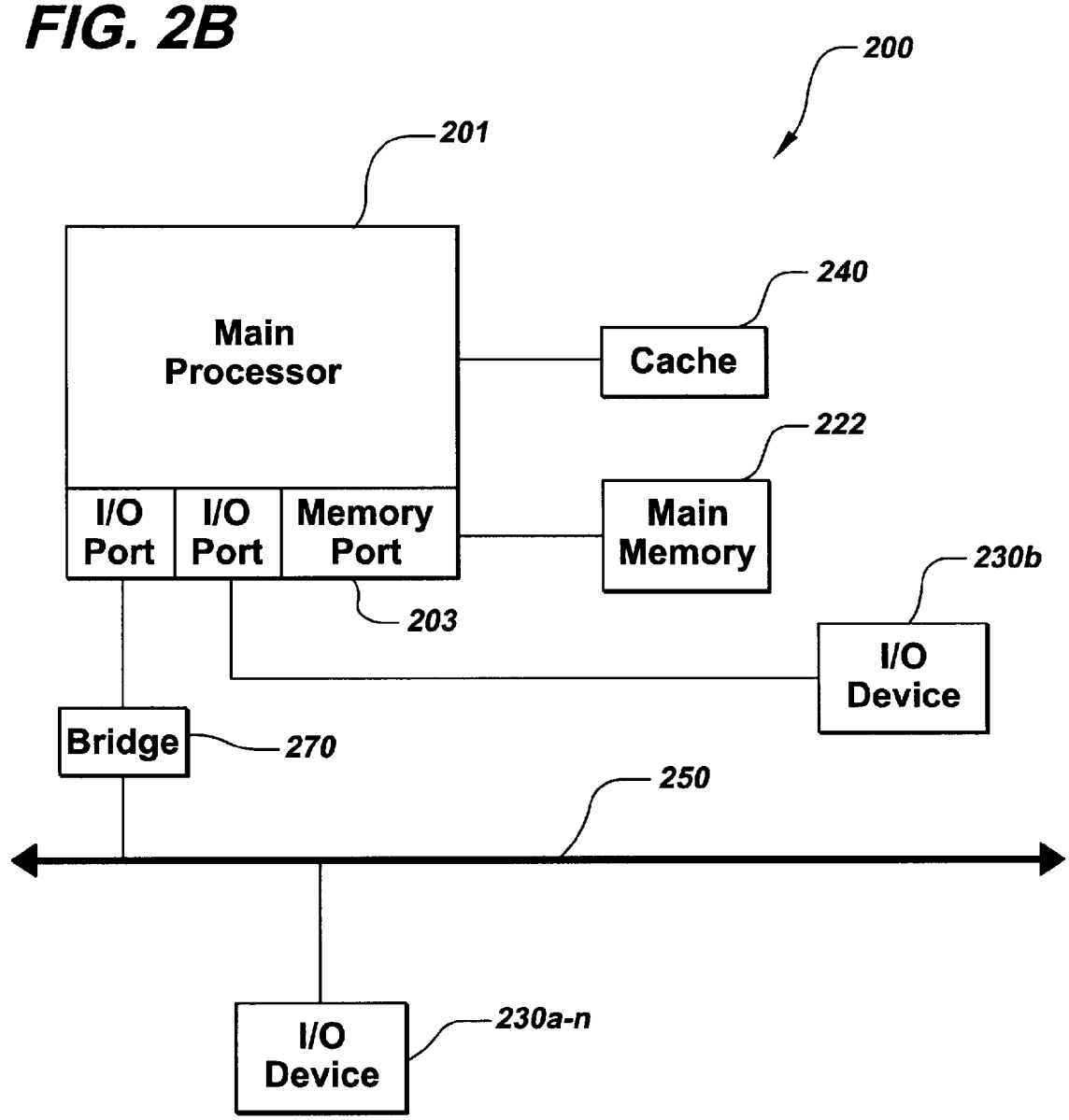

The computing devices 105, communications gateway 116, and PBX 120 may be deployed as and/or executed on any type and form of computing device, such as a computer, network device or appliance capable of communicating on any type and form of network and performing the operations described herein or known in the art. As shown in FIGS. 2A and 2B each computing device 200 includes a central processing unit 201 and a main memory unit 222. As shown in FIG. 2A, a computing device 200 may include a visual display device 224, a keyboard 226 and/or a pointing device 227, which can control a cursor, such as a mouse. Each computing device 200 may also include additional optional elements, such as one or more input/output devices 230a-230b (generally referred to using reference numeral 230), and a cache memory 240 in communication with the central processing unit 201.

The central processing unit 201 is any logic circuitry that responds to and processes instructions fetched from the main memory unit 222. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein.

Main memory unit 222 may be one or more memory chips capable of storing data and allowing any storage location to be directly accessed by the microprocessor 201, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 222 may be based on any of the above described memory chips, or any other available memory chips capable of operating as described herein. In the embodiment shown in FIG. 2A, the processor 201 communicates with main memory 222 via a system bus 250 (described in more detail below). FIG. 2A depicts an embodiment of a computing device 200 in which the processor communicates directly with main memory 222 via a memory port 203. For example, in FIG. 2B the main memory 222 may be DRDRAM.

FIG. 2B depicts an embodiment in which the main processor 201 communicates directly with cache memory 240 via a secondary bus, sometimes referred to as a backside bus. In other embodiments, the main processor 201 communicates with cache memory 240 using the system bus 250. Cache memory 240 typically has a faster response time than main memory 222 and is typically provided by SRAM, BSRAM, or EDRAM. In the embodiment shown in FIG. 2A, the processor 201 communicates with various I/O devices 230 via a local system bus 250. Various busses may be used to connect the central processing unit 201 to any of the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 224, the processor 201 may use an Advanced Graphics Port (AGP) to communicate with the display 224. FIG. 2B depicts an embodiment of a computer 200 in which the main processor 201 communicates directly with I/O device 230 via HyperTransport, Rapid I/O, or InfiniBand. FIG. 2B also depicts an embodiment in which local busses and direct communication are mixed: the processor 201 communicates with I/O device 230 using a local interconnect bus while communicating with I/O device 230 directly.

The computing device 200 may support any suitable installation device 216, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client software, or portion thereof. The computing device 200 may further comprise a storage device 228, such as one or more hard disk drives or redundant arrays of independent disks, for storing an operating system and other related software, and for storing application software programs such as any program related to a client software package 220. Optionally, any of the installation devices 216 could also be used as the storage device 228. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 200 may include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 200 communicates with other computing devices 200' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 218 may comprise a built-in network adapter, network interface card, PCMCIA network card, card bus network adapter, wireless network adapter, USB network adapter, modem or any other device suitable for interfacing the computing device 200 to any type of network capable of communication and performing the operations described herein.

A wide variety of I/O devices 230a-230n may be present in the computing device 200, some of which may function as pointing devices. Input devices include keyboards, mice, trackpads, trackballs, microphones, and drawing tablets. Output devices include video displays, speakers, inkjet printers, laser printers, and dye-sublimation printers. The I/O devices 230 may be controlled by an I/O controller 223 as shown in FIG. 2A. The I/O controller may control one or more I/O devices such as a keyboard 226 and a pointing device 227, e.g., a mouse or optical pen. Furthermore, an I/O device may also provide storage 228 and/or an installation medium 216 for the computing device 200. In still other embodiments, the computing device 200 may provide USB connections to receive handheld USB storage devices such as the USB Flash Drive line of devices manufactured by Twintech Industry, Inc. of Los Alamitos, Calif.

In some embodiments, the computing device 200 may comprise or be connected to multiple display devices 224a-224n, which each may be of the same or different type and/or form. As such, any of the I/O devices 130a-130n and/or the I/O controller 223 may comprise any type and/or form of suitable hardware, software, or combination of hardware and software to support, enable or provide for the connection and use of multiple display devices 224a-224n by the computing device 200. For example, the computing device 200 may include any type and/or form of video adapter, video card, driver, and/or library to interface, communicate, connect or otherwise use the display devices 224a-224n. In one embodiment, a video adapter may comprise multiple connectors to interface to multiple display devices 224a-224n. In other embodiments, the computing device 200 may include multiple video adapters, with each video adapter connected to one or more of the display devices 224a-224n. In some embodiments, any portion of the operating system of the computing device 200 may be configured for using multiple displays 224a-224n. In other embodiments, one or more of the display devices 224a-224n may be provided by one or more other computing devices, such as computing devices 200a and 200b connected to the computing device 200, for example, via a network. These embodiments may include any type of software designed and constructed to use another computer's display device as a second display device 224a for the computing device 200. One ordinarily skilled in the art will recognize and appreciate the various ways and embodiments that a computing device 200 may be configured to have multiple display devices 224a-224n.

In further embodiments, an I/O device 230 may be a bridge 270 between the system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 200 of the sort depicted in FIGS. 2A and 2B typically operate under the control of operating systems, which control scheduling of tasks and access to system resources. The computing device 200 can be running any operating system such as any of the versions of the MICROSOFT Windows operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 200 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 200 may comprise a device of the IPOD family of devices manufactured by Apple Computer of Cupertino, Calif., a PLAYSTATION 2, PLAY- STATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In other embodiments, the computing device 200 may have different processors, operating systems, and input devices consistent with the device. For example, in one embodiment the computer 100 is a TREO 180, 270, 1060, 600, 650, 680, 700p, 700w/wx, 750, 755p, 800w, Centro, Pro smart phone manufactured by Palm, Inc. In this embodiment, the TREO smart phone is operated under the control of the PALM OS operating system and includes a stylus input device as well as a five-way navigator device.

In other embodiments, the computing device 200 is a mobile device, such as a JAVA-enabled cellular telephone or personal digital assistant (PDA), such as the i55sr, i58sr, i85s, i88s, i90c, i95c1, i335, i365, i570, 1576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computer system 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, Blackberry Pearl Flip. In yet other embodiments, the computing device 200 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

The computing devices 105 may also be referred to as client nodes, client machines, endpoint nodes, or endpoints. In some embodiments, a computing device 105 has the capacity to function as both a client node seeking access to resources provided by a server and as a server providing access to hosted resources for other computing devices 105.

A computing device 105 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 105. In some embodiments, the application may be a server-based or a remote-based application executed on behalf of the computing device 105 on a server. In one embodiment, the server may display output data to the computing device 105 using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

In some embodiments, the client software 220 provides functionality related to establishing a communication session, such as a telephone call, a voice-over IP call, a chat session, an e-mail session, or other communications session. In one of these embodiments, the client software 220 can provide the end-user 106 of the client 105 with functionality that allows the end-user to "click" a telephone number or other recognized pattern within output of a software application and "call" that telephone number. Upon selection of the telephone number, the client computer 105 signals the communications gateway 116 to issue commands to the PBX 120, which in turn establishes the communication session. In addition, the end-user 106 can edit the telephone number prior to establishing the call and also designate a phone number that the end-user wants to be called at, if the end-user 106 is away from their telephone that is associated with the PBX 120. Furthermore, the client software 220 may perform directory traversal to locate numbers that are not located in the application output displayed by a window, but instead are stored in one or more heterogeneous or homogenous directory services (e.g., MICROSOFT OUTLOOK contacts and other directory sources). Additional details of the client software 220 are described below.

Figure 3:
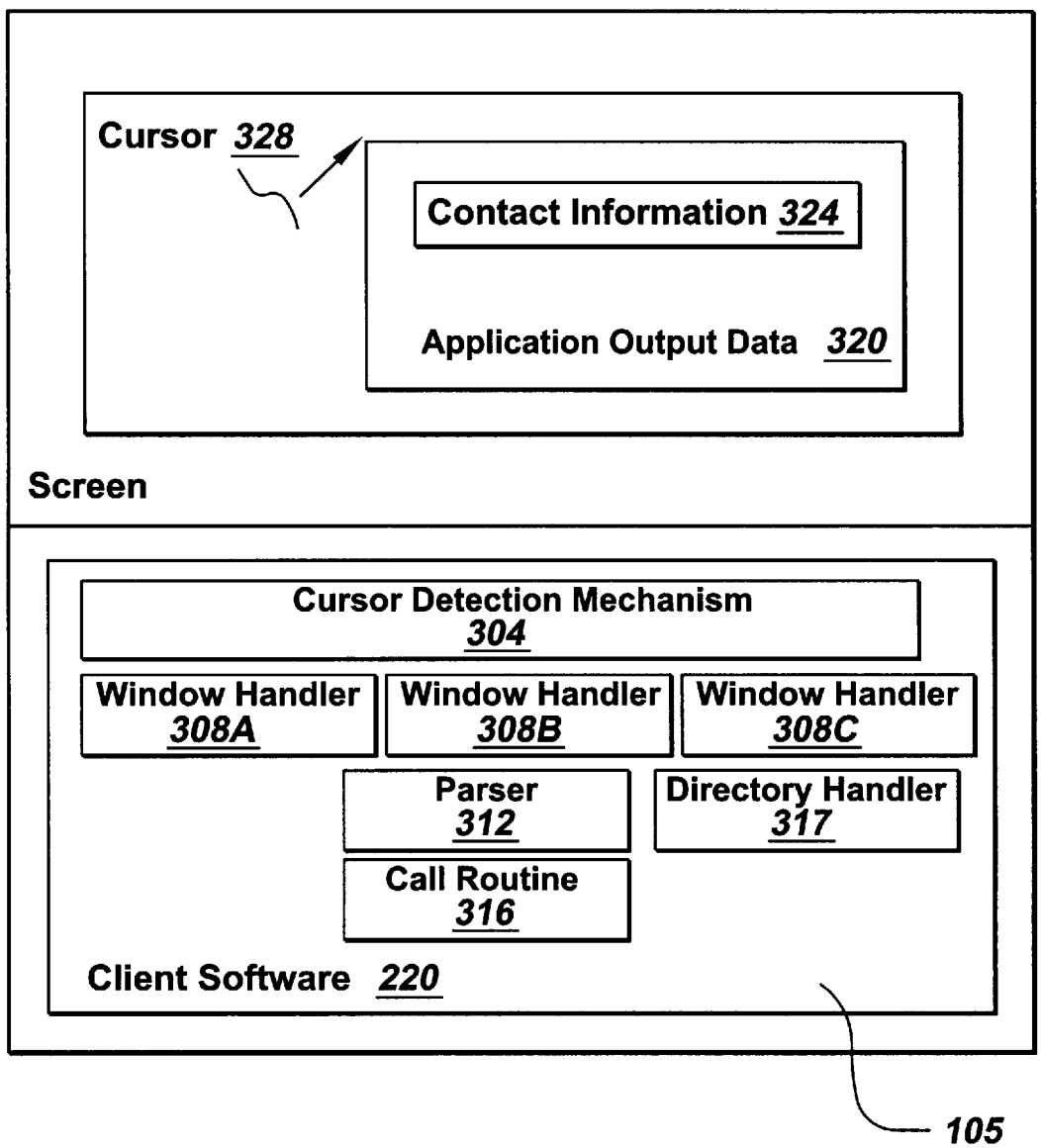
FIG. 3 is a block diagram of an embodiment of a client application for enabling a communications session.

Referring now to FIG. 3, a block diagram depicts one embodiment of client software 220. In brief overview, the client software 220 includes a cursor detection hooking mechanism 304, a plurality of window handlers 308a, 308b, 308c (referred to generally as processes handler 308), a parser module 312, a call routine 316, and one or more directory handlers. Each of these modules can communicate with each other, directly or indirectly, using known programming techniques. In some embodiments, the cursor detection hooking mechanism 304 is optional. In other embodiments, the directory handlers are optional. In further embodiments, one or more of each or any of the components may be provided on one or more software applications 220.

Referring now to FIG. 3, and in greater detail, the cursor detection mechanism 304 comprises any logic, function and/or operations to detect a status, movement or activity of a cursor, or pointing device, on the screen of the client computing device 105. The cursor detection mechanism 304 may comprise software, hardware, or any combination of software and hardware. In one embodiment, the cursor detection mechanism 304 comprises an application, a program, a library, a process, a service, a task, or a thread. In another embodiment, the cursor detection mechanism 304 may include an application programming interface (API) hook into the operating system to obtain or gain access to events and information related to a cursor, and its movement on the screen. In still another embodiment, using an API hooking technique, the client software 220 and/or cursor detection mechanism 304 monitors and intercepts operating system API calls related to the cursor and/or used by applications. In some embodiments, the cursor detection mechanism 304 API intercepts existing system or application's functions dynamically at runtime.

In one embodiment, the cursor detection mechanism 304 may include any type of hook, filter or source code for receiving cursor events or run-time information of the cursor's position on the screen, or any events generated by button clicks or other functions of the cursor. In another embodiment, the cursor detection mechanism 304 may comprise any type and form of pointing device driver, cursor driver, filter, or any other API or set of executable instructions capable of receiving, intercepting or otherwise accessing events and information related to a cursor on the screen. In still another embodiment, the cursor detection mechanism 304 detects the position of the cursor or pointing device on the screen, such as the cursor's x-coordinate and coordinate on the screen. In yet embodiment, the cursor detection mechanism 304 detects, tracks or compares the movement of the cursor's X-coordinate and Y-coordinate relative to a previous reported or received X and Y-coordinate position.

In one embodiment, the cursor detection mechanism 304 comprises logic, functionality and/or operations to detect if the cursor or pointing device is idle or has been idle for a predetermined or predefined length of time. In another embodiment, the cursor detection mechanism 304 detects that the cursor has been idle for a predetermined length of time between 100 ms and 1 sec, such as 100 ms, 200 ms, 300 ms, 400 ms, 500 ms, 600 ms, 700 ms, 800 ms or 900 ms. In still another embodiment, the cursor detection mechanism 304 detects that the cursor has been idle for a predetermined length of time of approximately 500 ms, such as 490 ms, 495 ms, 500 ms, 505 ms or 510 ms. In still even another embodiment, the predetermined length of time to detect and consider the cursor is idle is set by the cursor detection mechanism 304. In yet another embodiment, the predetermined length of time is configurable by a user or an application via an API, graphical user interface or command line interface.

In some embodiments, a sensitivity of the cursor detection mechanism 304 may be set such that movements in either the X or Y coordinate position of the cursor may be received and the cursor still detected and/or considered idle. In one of these embodiments, the sensitivity may indicate the range of changes to either or both of the X and Y coordinates of the cursor which are allowed for the cursor to be considered idle by the cursor detection mechanism 304. For example, if the cursor has been idle for 200 ms and the user moves the cursor a couple or a few pixels/coordinates in the X and/or Y direction, and then the cursor is idle for another 300 ms, the cursor detection mechanism 205 may indicate the cursor has been idle for approximately 500 ms.

The window handler 308 analyzes the contents of application output 320 displayed in a window on a display device of a computing device. In one embodiment, a resource executing on the computing device 105 generates application output data and directs the display, to a user of the computing device, of the generated application output data. In another embodiment, the application output data is displayed within a window associated with an application executing on the computing device 105.

In some embodiments, each window handler 308 interacts with a single type of application. In one of these embodiments, a separate window handler 308 may be provided for each of a type of application such as, for example, an internet browsing application (such as, for example, MICROSOFT INTERNET EXPLORER), a word processing application (such as, for example, MICROSOFT WORD), or a spreadsheet application (such as, for example, MICROSOFT EXCEL). In another of these embodiments, a separate window handler 308 may be provided for each of a type of field, such as, for example, an Edit field (this includes applications providing notepad functionality) or a Static text field. In still another of these embodiments, additional window handlers are included for other applications (e.g., portable document format reader applications such as ADOBE reader, presentation generation and viewing applications such as MICROSOFT POWERPOINT, and the like). In still even another of these embodiments, a window handler 308 that processes a specific type of application may be referred to as an application-specific window handler 308. In other embodiments, a single window handler can interact with multiple applications that have similar characteristics. In one of these embodiments, there may be fewer application specific handlers than there are resources generating application output data for display.

In some embodiments, when the pointer 328 is idle, the client software 220 initiates each of the window handlers 308. In other embodiments, only a subset of the window handlers 308 is initiated. In one of these embodiments, the client software 220 determines which window is active and thus which application is producing output displayed in the active window. In another of these embodiments, the client software 220 transmits to a window handler 308*a* at least one of a window identifier, window identification information and application type. In still another of these embodiments, the window handler 308*a* determines whether or not it includes functionality for processing application output data 320 in the identified window. In still even another of these embodiments, a first window handler 308*a* responds with an indication that it cannot process the application output data 320, at which point a second window handler 308 is called. In further embodiments, when a window handler 308 is initiated, if the window handler 308 includes functionality for processing application output data 320 displayed in the window, the window handler 308 determines whether a specific pattern of characters exists within a specific area determined relative to the location of the cursor 328 (such as within a window near the cursor), which is described in more detail below with reference to FIG. 3B.

In one embodiment, and for example, if the active window is a static window, a window handler 308 retrieves text from within the application using a WM_GETTEXT message; the window handler 308 analyzes the returned contents for patterns. In another embodiment, the parser 312 analyzes the returned contents for patterns. If, in one example, a telephone number is found, the software 220 displays the identified telephone number to the end-user. In still another embodiment, and as another example, if an edit window is the active window, the window handler 308 uses EM_* messages that are a part of the operating system API; text that is in the vicinity of the pointer location is returned using the WM_GETTEXT and EM_CHARFROMPOS messages.

In one embodiment, if the active window is a browser window, such as a MICROSOFT INTERNET EXPLORER window, the window handler 308 extracts the underlying HTMLDocument2 object from the window using the WM_HTML_GETOBJECT message. The window handler 308 then traverses the HTML to get the IHTMLBodyElement object, from which an IHTMLTxtRange object can be extracted containing the text under the location of the pointer. In another embodiment, if the active window is a word processing window, such as a MICROSOFT WORD window, an application specific window handler 308 extracts the underlying IID_Window object from the window using the AccessibleObjectFromWindow API method. From that object, the RangeFromPoint method returns an IID_Range object containing the text at the location of the pointer.

In some embodiments, none of the window handlers 308 include functionality for analyzing application output data 320 of an identified window. In one of these embodiments, a default window handler is called. In another of these embodiments, the default window handler performs screen captures (or screen scraping), object character recognition, and pattern matching.

Referring now to FIG. 4A, a block diagram depicts one embodiment of a system 401, including a plurality of routines 410 for processing window information to obtain communication information for establishing and facilitating a communication session. In one embodiment, each routine within the plurality of routines 410 is assigned a priority. In another embodiment, each of the routines is executed sequentially and a routine with a higher priority executes before a routine with a lower priority. In still another embodiment, the routine with the highest priority is the window handler filter routine 405.

Referring now to FIG. 4A, and in more detail, the system 401 includes a plurality of routines 410. In one embodiment, an execution of the software 220 generates the system 401. In another embodiment, a system 401 is provided within a virtual machine executing on the computing device 200. In still another embodiment, a system 401 is provided by an execution of a software routine or software application executing on a network and in communication with other software routines, software applications, computing devices, and virtual machines also resident on the network. In yet another embodiment, the system 401 includes a single window handler routine 308 able to execute at least one sub-routines dedicated to executing window handler routines 308 configured to analyze and interpret window information. In some embodiments, a system 401 includes a single routine able to execute multiple sub-routines, where each sub-routine is encapsulated in a plug-in software application. In one of these embodiments, the plug-in software application(s) may reside in any of the following locations: within the software 220; within the computing device 200; on a network, such as network 114; on a device located on the network; on a virtual machine on the network; in a storage repository accessible via the network; or any other local or remote location able to be accessed by an application or routine executing within the system 401.

In one embodiment, a plurality of routines 410 is included within the system 401. In another embodiment, the system 401 includes a plurality of routines 410 where each routine can be any of the following: a software application, a software program, a set of commands, or any other collection of instructions able to receive and process input to generate a responsive output. In still another embodiment, the routines included within the plurality of routines 410 may be any of the above mentioned application specific window handlers 308*a*, 308*b*, and 308*c*.

In one embodiment, the plurality of routines 410 includes any of the above mentioned application specific window handlers 308 as well as a window handler filter routine 405. In another embodiment, the plurality of routines 410 includes both the above-mentioned application specific window handlers 308, a window handler routine, and other window handler routines able to utilize window information to obtain communication information and/or to determine an optimal method for obtaining communication information.

In some embodiments, the system 401 includes a plurality of routines 410 where each routine is assigned a priority. Assignment of the priority can, in one of these embodiments, be a result of user input designating a priority scheme and further assigning a priority to each routine. In another of these embodiments, a priority scheme is used in which a priority assigned to each window handler routine 410 is a result of at least one determination indicative of the necessity that a particular routine execute prior or subsequent to another routine included within the plurality of routines 410. For example, the system may de-prioritize a window handler routine 308 that captures data displayed in a region of a screen, applies a process for optical character recognition, and analyzes the OCR data for contact information, and the system may assign a higher priority level to a window handler routine implementing a more efficient process for identifying contact information. In such an embodiment, the at least one determination can be generated by any of the following: an arbiter application utilizing both system and routine information to determine a priority and further assign the determined priority to a routine; an application compiling system statistics to determine a priority and further assign the determined priority to a window handler routine 410; an application able to receive user input indicative of a particular priority level and further assign that priority level to a user-specified window handler routine 410; a lookup table including identification information for each window handler routine 410 and a table of priorities where identification information for each window handler routine 410 is linked to a particular priority; a listing of each window handler routine 410 where the list further dictates the priority level for each window handler routine 410; or any other system, application, or data specific method of determining the priority level of a window handler routine 410. In still another of these embodiments, a plurality of window handler routine 410 include a window handler filter routine 405 having the highest priority level of any window handler routine 410 and subsequent window handler routine 410 are arbitrarily assigned priority levels. In still even another embodiment, the plurality of window handler routine 410 includes a window handler filter routine 405 having a priority level that is higher than subsequent window handler routines 410. The priority level, in one embodiment, can be any of the following values: a numeric value; a percentage value; a value based on prior and subsequent routines in the chain of priorities; or any other value able to indicate a routines priority in relation to other routines included within a plurality of window handler routine 410.

Figure 4B:
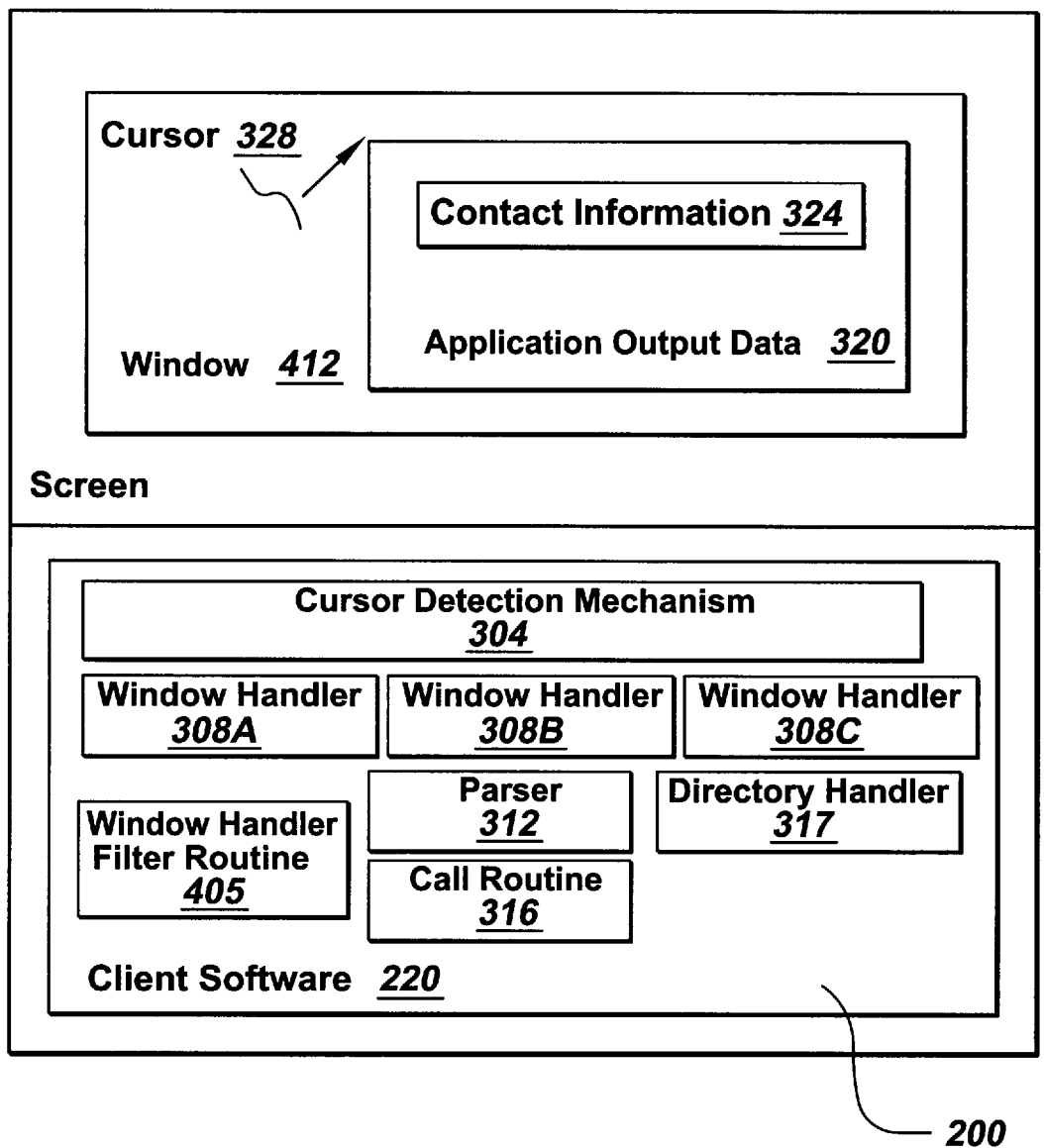
FIG. 4B is a block diagram depicting one embodiment of a system for efficient processing of data displayed by a window.

Referring now to FIG. 4B, a system for efficient processing of data displayed by a window includes a window and a window handler filter routine. In brief overview, a window 412 is displayed to a user of a computing device 200. The window handler filter routine 405 obtains window identification information associated with the window 412. The window handler filter routine 405 prevents operation on application output data 320 displayed in the window 412, by a window handler routine, when the window identification information associated with the window represents a type of window listed within a list of types of window.

Referring now to FIG. 4B, and in greater detail, the window handler filter routine 405, in one embodiment, is a routine that preempts the processing of application output data 320 displayed by a window 412. In another embodiment, the window handler filter routine 405 accesses a list of types of windows to determine whether the window 412 is a type of window that a window handler routine 410 should analyze to determine whether the application output data 320 displays contact information. In still another embodiment, the list specifies a list of windows for which the system has determined that no analysis by a window handler routine 410 is required; for example, a predefined list created by an administrator may specify which types of windows the administrator knows do not contain contact information. In some embodiments, the window handler filter routine 405 includes programming code containing the list. In other embodiments, the window handler filter routine 405 accesses a file containing the list.

In some embodiments, the window handler filter routine 405 includes functionality for obtaining window identification information associated with the displayed window, the window identification information indicative of a type of the window. In one of these embodiments, the window handler filter routine 405 uses an application programming interface (API) provided by an operating system on the computing device 200 to request information associated with the window 412.

In one embodiment, the system includes a client agent identifying the window displayed to the user and executing the window handler filter routine responsive to the identification. In another embodiment, the client agent is the client software 220. In still another embodiment, the client agent is in communication with the client software 220. In yet another embodiment, the client agent includes a module using an API to query a resource—such as an application or operating system executing on the computing device 200—to retrieve window identification information. In some embodiments, upon determining that a resource executing on the computing device 200 has generated a window and application output data 320, the client agent executes at least one of the window handler routines 400 and the window handler filter routine 405. In other embodiments, the client agent transmits, to the window handler filter routine 405, the window identification information and receives, from the window handler filter routine, an indication that the window handler filter routine has analyzed the application output data to determine whether the application output data contains contact information. In further embodiments, a window handler filter routine 405 is implemented via an embodiment of the method illustrated in FIG. 5.

Figure 5A:
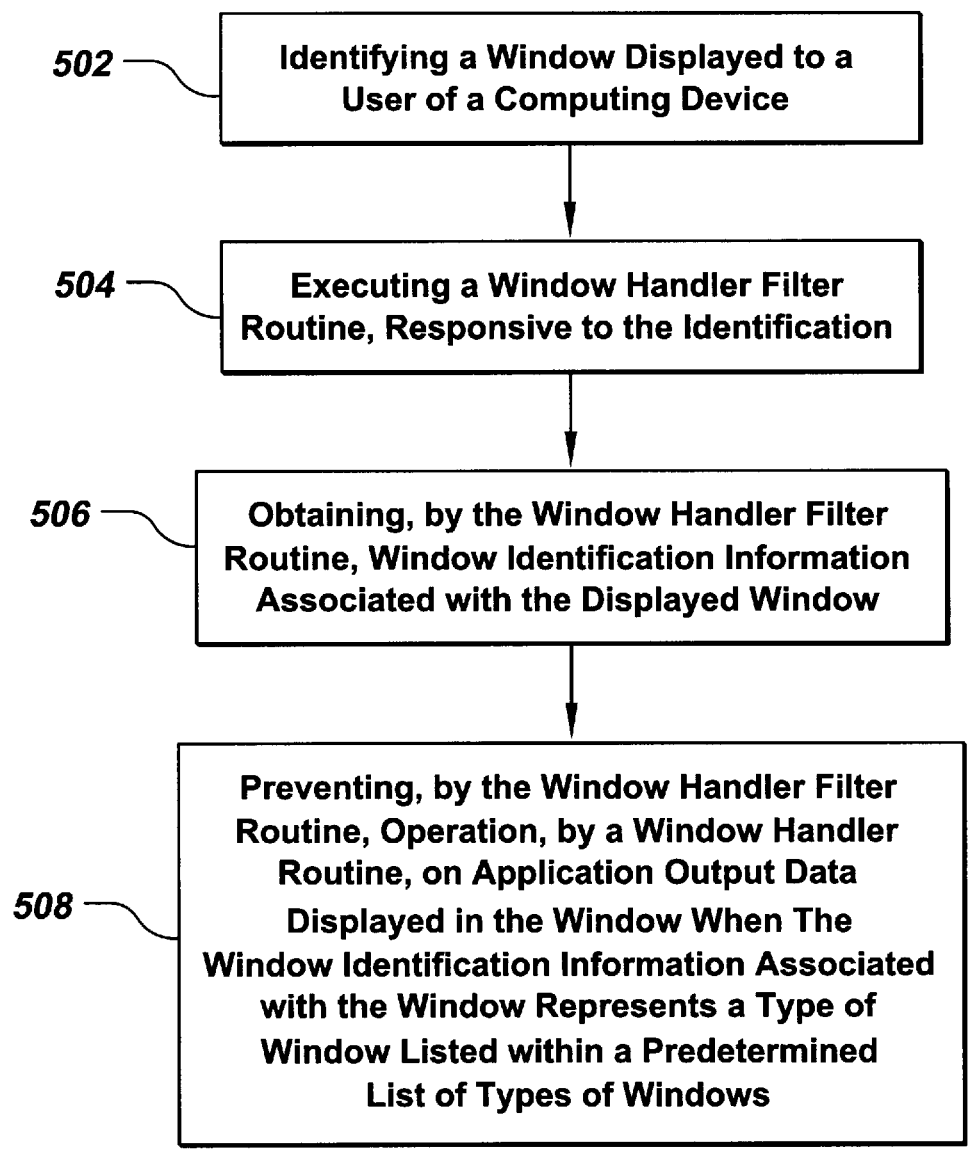
FIG. 5A is a flow diagram depicting one embodiment of a method for efficient processing of data displayed by a window.

Referring now to FIG. 5A, a flow diagram depicts one embodiment of a method for efficient processing of data displayed by a window. In brief overview, the method includes identifying a window displayed to a user of a computing device (502). The method includes executing a window handler filter routine, responsive to the identification (504). The method includes obtaining, by the window handler filter routine, window identification information associated with the displayed window (506). The method includes preventing, by the window handler filter routine, operation, by a window handler routine, on application output data displayed in the window when the window identification information associated with the window represents a type of window listed within a list of types of windows (508).

Referring now to FIG. 5A, and in greater detail, a window displayed to a user of a computing device is identified (502). In one embodiment, the window handler filter routine 405 identifies the window 412. In another embodiment, the client software 220 identifies the window and transmits an identification of the window to the window handler filter routine 405. In still another embodiment, the client software 220 identifies the window as described above in connection with FIGS. 3 and 4A. In some embodiments, and as described above, the client software 220 determines that a pointing device connected to the computing device is substantially idle and that a representation of the pointing device is displayed within the window 412. In one of these embodiments, the client software 220 identifies a window 412 displaying application output data 320 and displaying a graphical representation of a pointing device, such as cursor 328, which the client software 220 has determined is substantially idle. In other embodiments, the client software 220 determines that an input/output device connected to the computing device is has focused on a window 412. In still other embodiments, the determination that a pointing device or other input/output device is substantially idle is optional. In yet other embodiments, no determination is made and the window is identified via alternative mechanisms. In one of these embodiments, an operating system is queried to identify a window having window focus.

A window handler filter routine is executed, responsive to the identification (504). In one embodiment, the client software 220 executes the window handler filter routine 405. In another embodiment, the client software 220 executes the window handler filter routine 405 as described above in connection with FIGS. 3 and 4A.

The window handler filter routine obtains window identification information associated with the displayed window (506). In one embodiment, the window handler filter routine 405 obtains the window identification information from the client software 220. In another embodiment, the window handler filter routine 405 obtains the window identification information from a resource executing on the computing device 200, such as an operating system or an application; in such an embodiment, the window handler filter routine 405 may implement an API to query the resource and retrieve the identification. In still another embodiment, the window handler filter routine 405 obtains window identification information and determines a type of window associated with the window 412 responsive to an analysis of the window identification information. Additional embodiments of the obtained window identification information are described below in connection with FIG. 5B.

The window handler filter routine prevents operation, by at least one window handler routine, on application output data displayed in the window when the window identification information associated with the window represents a type of window listed within a list of types of windows (508). In one embodiment, the window handler filter routine 405 includes the list of types of windows. In another of these embodiments, the window handler filter routine 405 accesses a file containing the list. In still another of these embodiments, the window handler filter routine 405 retrieves, from a second computing device 200b, a file containing the list.

In one embodiment, the window handler filter routine 405 determines that the obtained window identification information identifies a type of window associated with the window 412. In another embodiment, the window handler filter routine 405 accesses the list of types of windows and determines whether the list enumerates the type of window identified by the window identification information. In still another embodiment, the window handler filter routine 405 determines that because the list enumerates the type of window associated with the window 412, no window handler routines 410 should analyze the application output data 320. In yet another embodiment, the list enumerates types of windows that do not contain contact information.

In some embodiments, the window handler filter routine 405 transmits, to the client software 220, an indication that the window handler filter routing 405 has analyzed the application output data 320 displayed by the window and determined that the data contains no contact information. In one of these embodiments, the window handler filter routine 405 transmits the indication although it has determined that no analysis should occur. In other embodiments, the window handler filter routine 405 identifies the type of window as a type not enumerated by the list. In one of these embodiments, the window handler filter routine 405 transmits, to a client agent, such as the client software 220, an indication that the window handler filter routine 405 has not, or cannot, analyze the application output data 320.

Figure 5B:
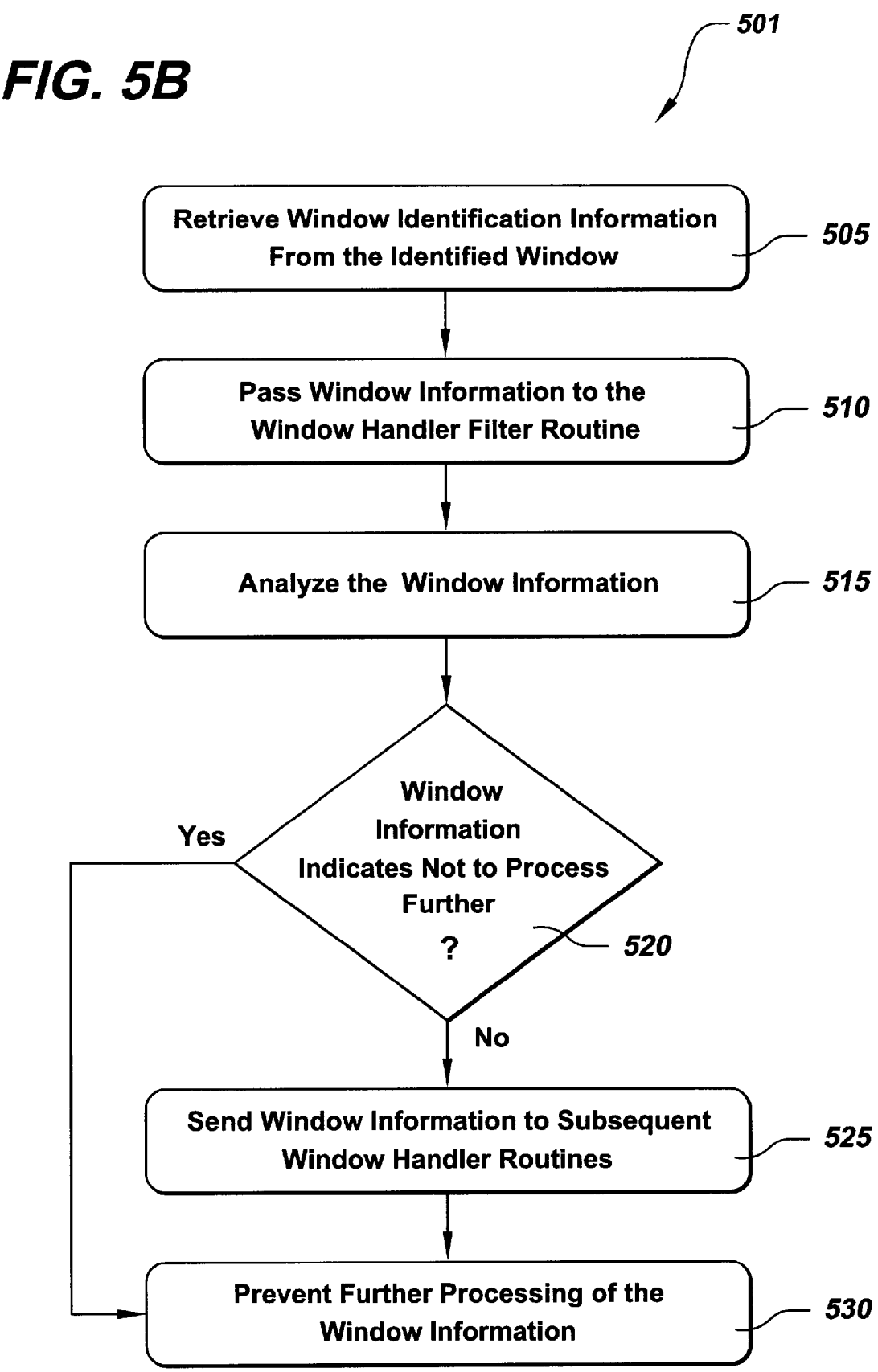
FIG. 5B is a flow diagram depicting one embodiment of a method for analyzing window information.

Referring now to FIG. 5B, a flow diagram depicts one embodiment of a method 501 for implementing a window handler filter routine. In brief overview, window identification information is retrieved from an identified window (step 505). The retrieved window identification information is passed to the window handler filter routine (step 510). The window identification information is analyzed by the window handler filter routine (step 515), and a determination is made as to whether or not the window identification information should be processed by subsequent routines (step 515). When a determination is made that the window identification information should be further processed, the window identification information is sent to subsequent window handler routines (step 525). When a determination is made that the window identification information should not be processed any further, the window identification information is prevented from being processed by any subsequent window handler routines (step 530).

Referring now to FIG. 5B, and in greater detail, window identification information is retrieved from an identified window (step 505). In some embodiments, the window identification information is retrieved by the window handler filter routine; in other embodiments, the window identification information is retrieved by another routine included within either of the system 401 or one of the plurality of routines 410. An identified window can be a graphical representation of an executing application displayed on the visual display device 224, where a cursor 328 also present on the visual display device 224 has a coordinate position on the display device 224 that positions the cursor 328 in a substantially similar position to that of the window. In other words, the identified window is a window, displayed on the display device 224, over which the cursor 328 is positioned. Some embodiments determine the identified window via a mouse-over function that utilizes the position of a cursor 328 on a display device to determine a "selected object." In these embodiments, windows displaying application output data 320 are considered a "selected object" when the cursor 328 is positioned over the graphical display of the application window. Window identification information, in some embodiments, includes a window handle or other encapsulated data item able to relay information about a particular window. In other embodiments, window identification information includes any one or combination of the following data: window class information; window family information; window size information; window position information; window identification information; information regarding the application output data displayed within the window; window text information; window style information; parent window information; child window information; sibling window information; window identification number; window caption information; or other information pertinent to determining attributes of the window, attributes of the window indicative of the application executing and displaying data within the window, and/or attributes of related windows. Further embodiments may utilize the window identification information to determine a type of window; where the type of window may be determined based on the data included within the window identification information or the type of window may be identified by a value included within the window identification information. In embodiments where the type of window may be a value included within the window identification information, the type of window may be an attribute of the window defined by the operating system, an attributed defined by the application generating the application output data displayed within the window, or an attribute assigned by a routine associated with the window handler filter routine 405.

In one embodiment, the window identification information is passed to the window handler filter routine (step 510). In another embodiment, the window identification information is passed to the window handler filter routine 405. In still another embodiment, the window handler filter routine 405 retrieves the window identification information (step 505), and so there is no need for another component to pass the window identification information to the window handler filter routine 405 (step 510). Transmission of the window identification information to the window handler filter routine 405 (step 510) can, in some embodiments, be carried out by a separate routine or software application executing within or in conjunction with the system 401.

The window identification information is, in some embodiments, analyzed by the window handler filter routine (step 515) to determine whether or not the window identification information should be sent to subsequent window handler routines for processing (step 520). Analyzing the window identification information can include analyzing any of the following information: a window caption; information regarding the application output data displayed within the window; a window identification number; a window handle; information regarding related windows; a window class name; or any of the above-mentioned information. Determination as to whether or not the application output data 320 displayed within the window should be processed, can, in some embodiments, be made by comparing any of the above-mentioned window identification information data types to an empirically determined listing of corresponding types of windows. In such an embodiment, the empirically determined information can be hard coded into the window handler filter routine 405, the information could be stored in a database or lookup table, or the information could be listed as an aspect of a policy table. In these embodiments, the determination not to process the application output data 320 displayed within the window is made because the window identification information indicates that there is a low likelihood that the application output data will include communication information, such as contact information 324. A low likelihood can be characterized as a likelihood calculation and further determination that the calculated value is below a predetermined threshold, or the likelihood could be an absolute determination that the window identification information indicates that the application output data 320 will not contain communication information, such as contact information 324. In some embodiments, the determination not to process the application output data 320 displayed within the window is made by comparing the retrieved window identification information with a listing of allowed window types and/or allowed window attributes. In one of these embodiments, and as described in greater detail below in connection with FIGS. 6 and 7, this listing can be dynamically generated by the system.

When, in some embodiments, it is determined that the window identification information should be processed, the window identification information is sent to subsequent window handler routines (step 525). Each window handler routine will determine whether or not, based on the window identification information, that window handler routine may process the application output data 320 displayed within the window. The window identification information will continue to be passed to subsequent window handler routines 410 until a routine 410 is identified that include functionality for processing the application output data 320. In the event that no window handler routine 410 is found, a default routine will be called to process the application output data 320.

When, in some embodiments, it is determined that the window identification information should not be processed, further processing will be prevented (step 530). In such embodiments, the window identification information will not be passed to subsequent window handler routines 410 when it is determined that there is a low likelihood that the identified window displays application output data 320 that contains communication data. One example of this includes an attempt to retrieve window identification information from a window displaying a MICROSOFT OUTLOOK calendar. In this example, window identification information indicates that the application output data displayed is application output data related to a MICROSOFT OUTLOOK calendar object. The window handler filter routine 405 analyzes this information to determine whether or not a window displaying calendar application data should be searched for communication data. Based on comparison information, the window handler filter routine 405 determines that, in this example, the window displaying application output data generated by the MICROSOFT OUTLOOK calendar object should not be searched and the window identification information related to that window is not passed to subsequent window handler routines. In other words, the window handler filter routine 405 responds to the determination that the window displaying the calendar application data does not include communication data by preventing further processing of the application output data within the MICROSOFT OUTLOOK calendar window.

As described above in connection with FIGS. 3-5, the client software 220 may access each of a plurality of window handler routines 410 according to a priority level assigned to each of the plurality of window handler routines 410 and requests of each window handler routines 410 an indication as to whether the window handler routines 410 can analyze application output data 320 to determine whether the application output data 320 contains contact information 324. In one embodiment, the priority level assigned to the window handler filter routine 405 is the highest priority level and the client software 220 requests the indication from the window handler filter routine 405 before making the request of any other window handler routines 410. In another embodiment, if the window handler filter routine 405 responds with an indication that the window handler filter routine 405 cannot perform the analysis of the application output data 320, the client software 220 proceeds to make the request of each of the remaining window handler routines 410 until one of the window handler routines 410 responds with an indication that it can analyze the application output data 320 and determined whether the contact information 324. In still another embodiment, if the window handler filter routine 405 responds with an indication that the window handler filter routine 405 can perform the analysis and that no contact information 324 is displayed in the window 412, the client software 220 does not proceed to make the request of any of the other window handler routines 410. In yet another embodiment, therefore, if user is aware that a particular type of window 412 does not typically contain contact information 324, the user may add an identification of the type of window to the list accessed by the window handler filter routine 405, which can then identify whether a particular window has that type and indicate to the client software 22 that no contact information 324 is displayed, preventing analysis by any of the other window handler routines 410 of a window known not to include contact information. In some embodiments, therefore, the methods and systems described herein provide an improved process for determining whether a window contains contact information and avoid unnecessary analysis of windows known not to contain contact information.

In some embodiments, the window handler filter routine 405 accesses a list to determine whether or not to prevent operation on data displayed by a window. In one of these embodiments, the list is predetermined in that a programmer, administrator or other user of the systems and methods described herein identifies a type of window that does not contain, or is not likely to contain, contact information. In another of these embodiments, and by way of example, although a type of window, such as a window displaying a preview of a calendar month generated and displayed by a calendar application, may contain numbers and other data that a window handler routine 410 may identify as contact information and that client software 220 may display in a user interface element for establishing a telecommunications session (for example a window from which a user can initiate a telephone call to the number displayed), a human user of the systems and methods described herein may identify the displayed information not as a phone number but as a numerical representation of a date and, therefore, not interact with the user interface element. By manually directing the placement of an identification of the type of window on a list of types of windows filtered by the window handler filter routine 405, users of the methods and systems described herein may prevent unnecessary analysis of the data displayed by the window. In other embodiments, however, the list is predetermined in that a system is provided for automatically generating the list of filtered windows for use by the window handler filter routine 405.

Figure 6:
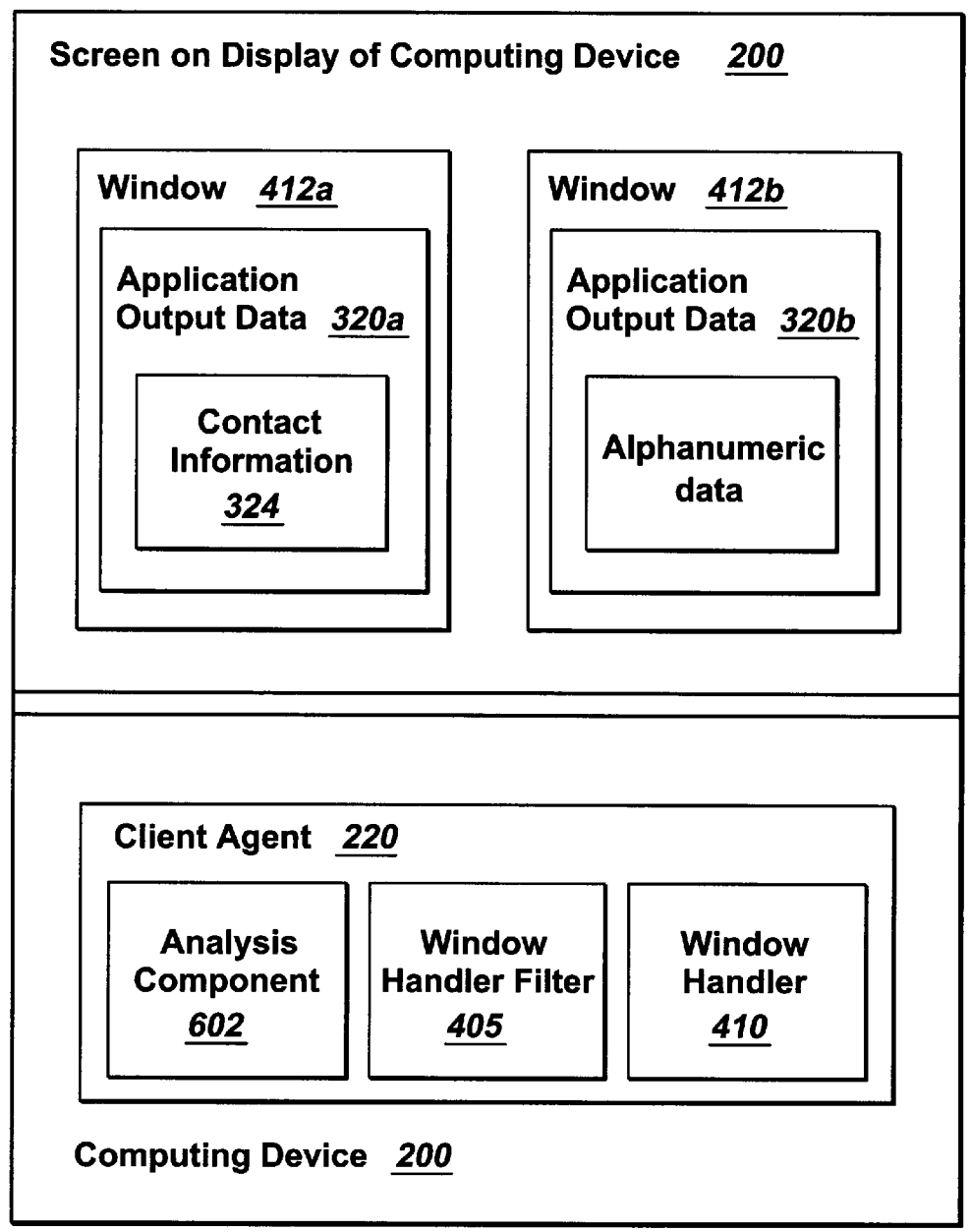
FIG. 6 is a block diagram depicting one embodiment of a system for identifying a window lacking communications data relevant to a user of a computing device.

Referring now to FIG. 6, a block diagram depicts one embodiment of a system for identifying a window lacking communications data relevant to a user of a computing device. In brief overview, a system for identifying a window lacking communications data relevant to a user of a computing device includes a client agent 220 and an analysis component 602. The client agent 220—which may be provided as part of client software 220 described above in connection with FIGS. 2-5—includes a window handler filter routine 405 and a window handler routine 410. The window handler filter routine 405 generates an identification of each of a plurality of windows displayed to a user of a computing device. The window handler routine 410 generates an indication of whether each of the plurality of windows displays contact information to the user. The client agent 220 generates an indication of whether the user interacted with the information displayed by each of the plurality of windows. The analysis component 602 analyzes, for each of the plurality of windows, at least one of: a received identification of each of the plurality of windows, a received indication of whether each of the plurality of windows displays contact information, and a received indication of whether the user interacted with the displayed contact information. The analysis component 602 generates an enumeration of window identification information for at least one filtered window.

Referring now to FIG. 6, and in greater detail, a window handler filter routine 405 within the client agent 220 generates an identification of each of a plurality of windows displayed to a user of a computing device 106. In one embodiment, the window handler filter routine 405 determines whether a window 412 should be analyzed by determining whether the window 412 is a type of window included in an enumeration of filtered windows, as described above in connection with FIGS. 4-5. In another embodiment, the window handler filter routine 405 determines that the window 412 is not of a type included in the enumeration of filtered windows and indicates, to the client agent 220 that data displayed by the window 412 should be analyzed by a window handler 410. For example, in still another embodiment, by responding to the client agent 220 request for analysis of the data 320 displayed by the window with a message indicating that the analysis component 602 cannot process the data 320, the window handler filter 405 has indicated that a window handler 410 should be called to process the data 320. In some embodiments, when the window handler filter routine 405 indicates to the client agent 220 that application output data 320a in a window 412a should be analyzed, the window handler filter routine 405 also transmits, to the analysis component 602, window identification information for the window 412a. In other embodiments, when the window handler filter routine 405 indicates to the client agent 220 that application output data 320a in a window 412a should be analyzed, the client agent 220 transmits, to the analysis component 602, window identification information for the window 412a.

As described above, the window handler routine 410 receives a request to analyze application output data 320 and determines whether a window 412 displays contact information 324. In one embodiment, the window handler routine 410 is in communication with the analysis component 502 and transmits, to the analysis component 602, an identification of whether it has identified information that may constitute contact information 324.

As described above, in embodiments in which the client agent 220 has identified a window displayed to a user of a computing device 106 and in which the window handler filter routine 405 has determined that the data displayed by the window 412 should be analyzed by a window handler routine 410, and in which the window handler routine 410 has determined that the application output data 320 may contain contact information 324, the client agent 220 may generate a user interface element allowing a user to initiate a telecommunications session with an entity associated with the contact information 324. In one of these embodiments, the client agent 220 may include a component for monitoring whether the user interacts with the user interface element to initiate the telecommunications session. In another of these embodiments, the client agent 220 transmits, to the analysis component 602, an indication of whether or not the user initiated the telecommunications session.

The analysis component 602 analyzes, for each of the plurality of windows, at least one of: a received identification of each of the plurality of windows, a received indication of whether each of the plurality of windows displays contact information, and a received indication of whether the user interacted with the displayed contact information. In one embodiment, based upon the analysis, the analysis component 602 determines whether or not users initiated telecommunications sessions with data identified as contact information. In another embodiment, therefore, the analysis component 602 evaluates the accuracy of the determinations made by the window handler filter routine 405 and the window handler routine 410. In still another embodiment, the analysis component 602 generates an enumeration of window identification information for at least one filtered window. In some embodiments, the analysis component 602 determines that the window handler filter routine 405 identified data as appropriate for analysis by a window handler 410 and the window handler 410 identified the data as containing contact information 324 but, when presented to a user, the user chose not to contact an entity associated with the contact information 324. In one of these embodiments, the analysis component 602 applies at least one heuristic to at least one of: a received identification of each of the plurality of windows, a received indication of whether each of the plurality of windows displays contact information, and a received indication of whether the user interacted with the displayed contact information in determining whether to filter at least one of the plurality of windows. In another of these embodiments, by collecting the indications of determinations by the window handler filter routine 405, the window handler 410 and the client agent 220 and applying heuristics, algorithms or other artificial intelligence to the collected data, the analysis component 602 identifies types of windows that do not typically display contact information used by users to initiate telecommunications systems and to prevent analysis on these types of windows for subsequently-displayed windows having these types. In still another of these embodiments, the analysis component 602 transmits the enumeration to the window handler filter routine 405 for use in subsequent evaluations of windows.

Figure 7:
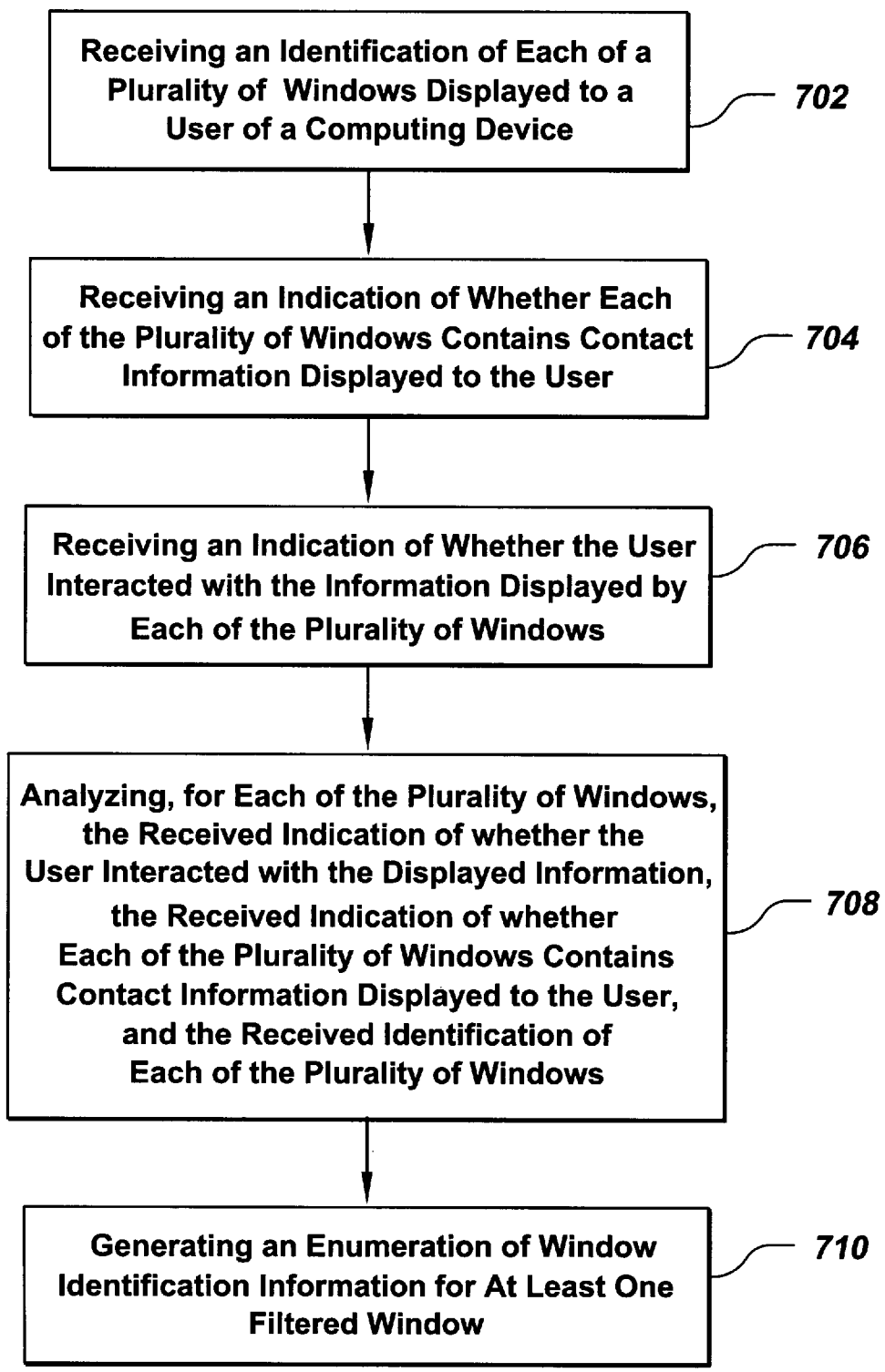
FIG. 7 is a flow diagram depicting one embodiment of a method for identifying a window lacking communications data relevant to a user of a computing device.

Referring now to FIG. 7, a flow diagram depicts one embodiment of a method for identifying a window lacking communications data relevant to a user of a computing device. The method includes receiving an identification of each of a plurality of windows displayed to a user of a computing device (702). The method includes receiving an indication of whether each of the plurality of windows contains contact information displayed to the user (704). The method includes receiving an indication of whether the user interacted with the information displayed by each of the plurality of windows (706). The method includes analyzing, for each of the plurality of windows, the received indication of whether the user interacted with the displayed information, the received indication of whether each of the plurality of windows contains contact information displayed to the user, and the received identification of each of the plurality of windows (708). The method includes generating an enumeration of window identification information for at least one filtered window (710).

Referring now to FIG. 7, and in greater detail, the analysis component 602 receives an identification of each of a plurality of windows displayed to a user of a computing device (702). In one embodiment, the analysis component 602 receives the identification from the window handler filter routine 405. In another embodiment, the analysis component 602 receives the identification after the window handler filter routine 405 has determined that the data 320 displayed by the window should by analyzed by a window handler routine 410. In still another embodiment, the analysis component 602 receives the identification from the client agent 220.

In one embodiment, the analysis component 602 receives information associated with each of the plurality of windows. In another embodiment, the analysis component 602 receives an identification of a window type associated with at least one window in the plurality of windows. In still another embodiment, the analysis component 602 receives an identification of an ancestor window of at least one window in the plurality of windows. In still even another embodiment, the analysis component 602 receives an identification of a descendant window of at least one window in the plurality of windows. In still another embodiment, the analysis component 602 receives an identification of a sibling window of at least one window in the plurality of windows. In another embodiment, the analysis component 602 receives an identification of a type of class of at least one window in the plurality of windows. In yet another embodiment, the analysis component 602 receives caption data associated with at least one window in the plurality of windows. In some embodiments, the analysis component 602 receives window identification information as described above in FIGS. 3-6.

The analysis component 602 receives an indication of whether each of the plurality of windows contains contact information displayed to the user (704). In one embodiment, the analysis component 602 receives the indication from the window handler routine 410. In another embodiment, the analysis component 602 receives the indication from the client agent 220. In still another embodiment, the analysis component 602 receives the indication from a parser 312 executing in the client agent 220.

In one embodiment, the analysis component 602 receives an identification of a telephone number displayed to the user. In another embodiment, the analysis component 602 receives an identification of a number associated with a facsimile machine is displayed to the user. In still another embodiment, the analysis component 602 receives an identification of an electronic mail address displayed to the user. In yet another embodiment, the analysis component 602 receives an identification that no contact information is displayed to the user.

In some embodiments, the analysis component 602 receives an indication that the window handler 410 has identified information within the application output data 320 that may or may not constitute contact information 324. In one of these embodiments, a parser 312 analyzes the information to determine whether or not the data is contact information. In another of these embodiments, the parser 312 transmits a determination to the analysis component 602 as to whether or not the data 320 is or contains contact information 324. In still another of these embodiments, the parser 312 is unable to determine whether the data 320 is or contains contact information 324.

The analysis component 602 receives an indication of whether the user interacted with the information displayed by each of the plurality of windows (706). In one embodiment, the client agent 220 generates a user interface element displaying information retrieved from one of the plurality of windows and allowing a user to initiate a telecommunications session. In another embodiment, the user interface includes an element such as a hyperlink, which the user may select to initiate the telecommunications session. In still another embodiment, the client agent 220 monitors the user interface element to determine whether or not the user interacts with the user interface element (for example, by using an input/output device to select the hyperlink). In some embodiments, the client agent 220 terminates display of the user interface element. In one of these embodiments, the client agent 220 determines, responsive to the monitoring of the user interface element, that the user has not interacted with the user interface element within a period of time; for example, the client agent 220 may have received or include an identification of a predetermined threshold of time, determine that a user has not interacted with the user interface element within the period of time, and remove the user interface element from display. In another of these embodiments, the client agent 220 determines that the user is interacting with a different user interface element—for example, a different window 412—and remove the user interface element from display. In embodiments in which the client agent 220 determines that the user has not interacted with the user interface element, the client agent 220 may transmit an identification of that lack of interaction to the analysis component 602.

The analysis component 602 analyzes, for each of the plurality of windows, the received indication of whether the user interacted with the displayed information, the received indication of whether each of the plurality of windows contains contact information displayed to the user, and the received identification of each of the plurality of windows (708). In one embodiment, the analysis component 602 applies at least one heuristic to the received indication of whether the user interacted with the displayed information. In another embodiment, the analysis component 602 applies at least one heuristic to the received indication of whether each of the plurality of windows contains contact information displayed to the user. In still another embodiment, the analysis component 602 applies at least one heuristic to the received indication of each of the plurality of windows. In some embodiments, the analysis component 602 determines, responsive to the analysis, that a type of window does not display contact information relevant to a user.

The analysis component 602 generates an enumeration of window identification information for at least one filtered window (710). In one embodiment, the analysis component 602 generates statistical data during the implementation of the methods and systems described above. In another embodiment, the analysis component 602 processes the statistical data to generate data representative of window attributes characteristic of a window that does not contain communication data in the displayed application output data 320. In still another embodiment, the analysis component 602 processes the statistical data to generate data representative of window attributes characteristic of a window that does not contain communication data that should be displayed to the user; for example, because the number is not relevant to the user or because the user is unlikely to use the number to initiate a telecommunications session.

The statistical data can, in some embodiments, include data generated when a success or failure condition occurs. In one of these embodiments, a failure condition occurs when the methods and systems are implemented to retrieve communication data from an identified window and the application output data displayed in the window does not include communication data. In another of these embodiments, a failure condition occurs when data identified as communication data is displayed to a user in a user interface element allowing the user to initiate a telecommunications session (such as a telephone call, facsimile transmission, voice over Internet Protocol call, web conference, or other session) but the user chooses not to initiate such a sessions; for example, the user may determine that the displayed data is not contact information. In still another of these embodiments, a success condition occurs when the methods and systems described above are implemented to retrieve communication data from an identified window and the application output data displayed in the window does include communication data and the user interacts with the user interface element displaying the communication data to initiate a telecommunications session. In yet another of these embodiments, the user initiates a telecommunications session, but only after modifying the displayed data; such a situation may be categorized as a failure or a success or as an intermediate condition. Any combination of statistical data can be combined or separated to provide indicators as to which windows will contain communication data.

In some embodiments, the analysis component 602 may determine whether or not a particular window should be searched by employing methods such as those that: implement learning algorithms able to use gathered information and make future decisions based on previously generated statistical data; autonomous algorithms that react based in part on gathered information, where the autonomous algorithms vary in their interaction with presently generated information based on past information; and algorithms that compile prior statistical information regarding the searching of application output data and further make decisions about future information input based on patterns, information, or other informational indicators within the gathered statistical information. In further embodiments, the analysis component 602 provides, to the window handler filter routine 405, the generated enumeration of window identification information for at least one filtered window.

In one embodiment, by determining whether or not a user is likely to use the information displayed in a particular type of window, the analysis component 602 can prevent unnecessary analysis of windows for which no user interaction is likely to occur. In another embodiment, the analysis component 602 improves the performance of the system and allows the window handler filter routine to more effectively prevent operation on windows of a type not likely to contain contact data or other data prompting a user to initiate a telecommunications session.

Figure 8:
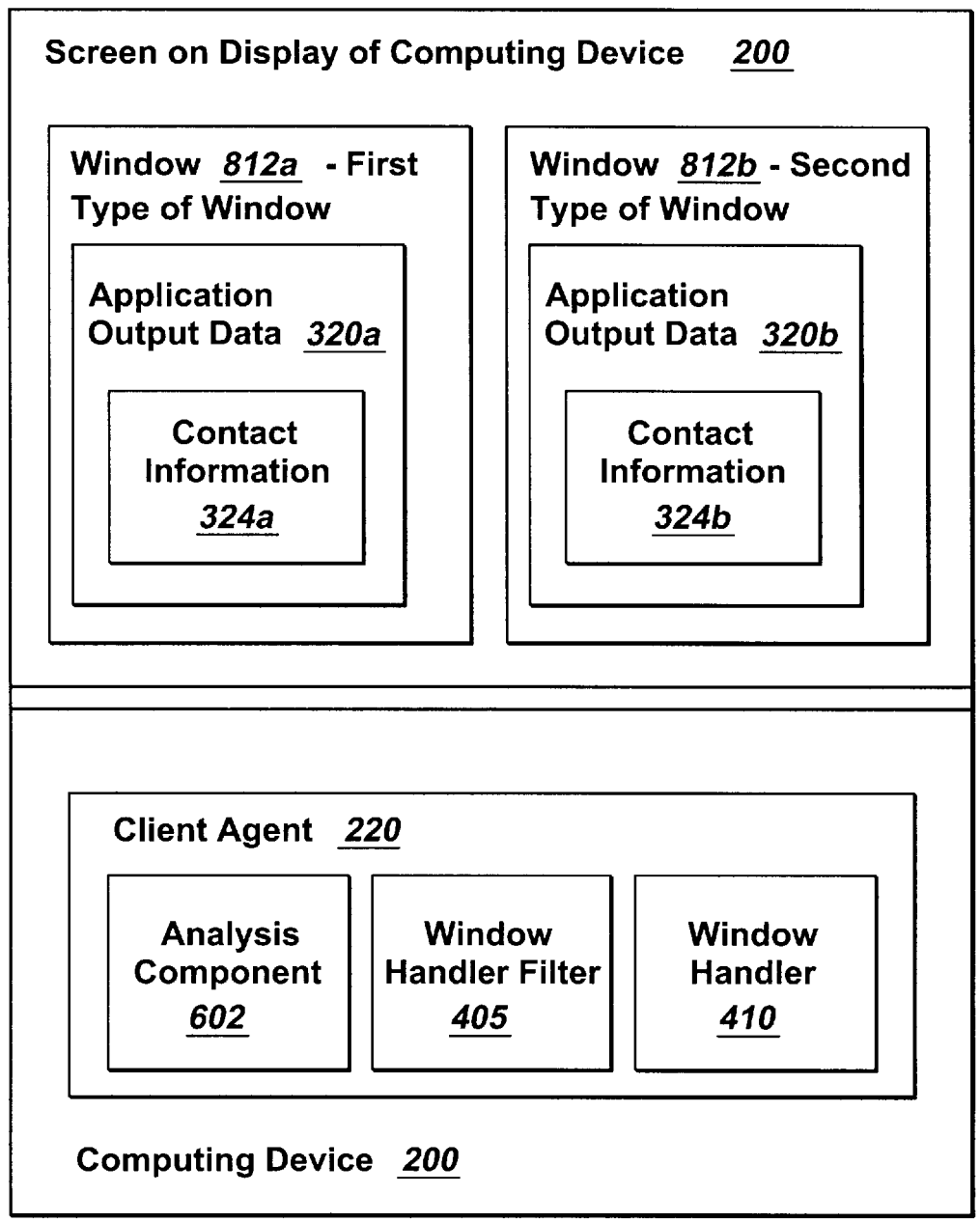
FIG. 8 is a block diagram depicting one embodiment of a system for identifying a process for analyzing data displayed by a window to a user of a computing device.

Referring now to FIG. 8, a block diagram depicts one embodiment of a system for identifying a process for analyzing data displayed by a window to a user of a computing device. In brief overview, the system includes a window handler filter routine 405 and a window handler 410. The window handler filter routine 405 receives window identification information associated with a window 812a displayed to a user of a computing device, the window 812a associated with a first type of window. The window handler filter routine 405 determines whether a window handler routine 410 executing on the computing device includes functionality for analyzing data displayed by the window 812a associated with the first type of window. The window handler routine 410 receives the window identification information and applies, to the window 812a associated with the first type of window, a process for determining whether a window 812b associated with a second type of window displays contact information.

Referring now to FIG. 8, and in greater detail, the window handler filter routine 405 receives window identification information associated with a window 812a displayed to a user of a computing device 200, the window 812a associated with a first type of window. In one embodiment, the type of the window 812 may refer to a type of resource—such as an application executing on the computing device 200—that generates the window. In another embodiment, the window handler filter routine 405 receives the window identification information from a client agent 220. In another embodiment, the window handler filter routine 405 implements an applications programming interface to query an operating system executing on the computing device 200 to retrieve window identification window associated with a window 812; for example, the client agent 220 may indicate to the window handler filter routine 405 that a resource executing on the computing device 200 has displayed a new window 812a and the window handler filter routine 405 may query the operating system to retrieve additional information associated with the window 812. In still another embodiment, the window handler filter routine 405 provides the functionality described above in connection with FIGS. 4-7. In some embodiments, the system includes a client agent 220 transmitting, to the window handler filter routine 405, the window identification information; the client agent 220 may be a client agent 220 or client software 220 as described above in connection with FIGS. 3-7.

The window handler filter routine 405 determines whether a window handler routine 410 executing on the computing device 200 includes functionality for analyzing application output data 320a displayed by the window 812a associated with the first type of window. In one embodiment, the window handler filter routine 405 identifies a type for the window 812a. In another embodiment, the window handler filter routine 405 identifies the type of window by analyzing the received window identification information. In still another embodiment, the window handler filter routine 405 includes functionality for identifying the type of the window as described above in connection with FIGS. 4-5. In some embodiments, to determine whether the system includes a window handler routine 410 capable of processing application output data 320a displayed by a window 812a associated with a first type of window, the window handler filter routine 405 accesses a mapping between a plurality of types of window and of window handler routines 405 providing functionality for analyzing each of the plurality of types of window. In one of these embodiments, and by way of example, the window handler filter routine 405 accesses a mapping indicating that a window handler routine 410A provides functionality for determining whether application output data displayed in a window 812a generated by a word processing application contains contact information, while a window handler routine 410B provides functionality for determining whether application output data displayed in a window 812b generated by a spreadsheet application contains contact information. In other embodiments, the window handler filter routine 405 accesses a mapping indicating that no window handler routine 410 provides functionality for determining whether application output data displayed in a window 812a contains contact information. In one of these embodiments, the window handler filter routine 405 may prevent operation on the window 812a, as described above in connection with FIGS. 5-6. In another of these embodiments, and as described in greater detail below, the window handler filter routine 405 may identify an alternate window handler routine 410 for determining whether application output data displayed in a window 812a contains contact information. In further embodiments, and by way of example, a mapping may include a file, table, database, or other data structure indicating whether a window handler routine 410 provides functionality for analyzing application output data 320 for a window of a particular type. In one of these embodiments, by way of example, and without limitation, the mapping may include information such as the following:

| Window Identification Information | Type of Window | Window Handler | Substitute Window Handler? |
|---|---|---|---|
| Process ID = OUTLOOK.EXE | Browser window | Window Handler 410A | N/A |
| Window Class ID = RichEdit20WPT | Window field | None | Window handler 410B for processing RichEdit20A fields |
| Top-level ID = RCTRL_RENWND32 | Parent Window | None | None - prevent operation on window |

In some embodiments, the window handler filter routine 405 accesses a first mapping to identify substitute window handlers 410 and accesses a second mapping to identify windows for which the window handler filter routine 405 should prevent operation. In other embodiments, a first window handler filter routine 405 determines whether to prevent operation on a window while a second window handler filter routine 405 determines whether to direct a window handler routine 410 to analyze a window 812a associated with a first type of window, the window handler routine 410 providing functionality for determining whether a window 812b associated with a second type of window displays contact information.

The window handler routine 410 receives the window identification information. In one embodiment, the window handler routine 410 is in communication with the client agent 220 and the window handler filter routine 405. In one embodiment, the window handler routine 410 includes a receiver receiving, from the window handler filter routine 405, a direction to apply, to the window associated with the first type of window, the process for determining whether a window associated with a second type of window displays contact information. The window handler routine 410 applies, to the window 812a associated with the first type of window, a process for determining whether a window 812b associated with a second type of window displays contact information. In still another embodiment, the client agent 220 generates at least one user interface displaying an interface element for initiating a telecommunications session based on identified contact information displayed by the window 812a associated with the first type of window.

Figure 9:
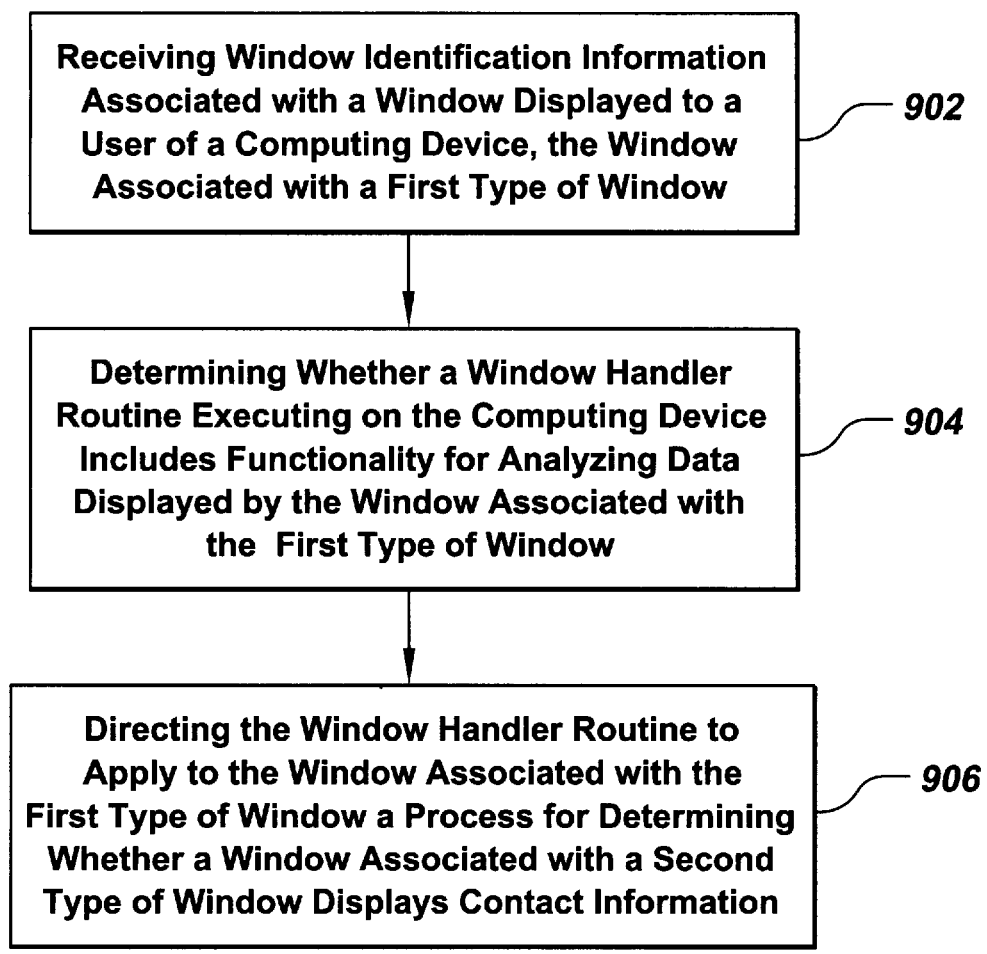
FIG. 9 is a flow diagram depicting one embodiment of a method for identifying a process for analyzing data displayed by a window to a user of a computing device.

Referring now to FIG. 9, a block diagram depicts one embodiment of a method for identifying a process for analyzing data displayed by a window to a user of a computing device. In brief overview, the method includes receiving window identification information associated with a window displayed to a user of a computing device, the window associated with a first type of window (902). The method includes determining whether a window handler routine executing on the computing device includes functionality for analyzing data displayed by the window associated with the first type of window (904). The method includes directing the window handler routine to apply to the window associated with the first type of window a process for determining whether a window associated with a second type of window displays contact information (906).

The method includes receiving window identification information associated with a window displayed to a user of a computing device, the window associated with a first type of window (902). In one embodiment, the window handler filter routine 405 receives the window identification information. In another embodiment, the window handler filter routine 405 receives an identification of a window type of a window 812a. In still another embodiment, the window handler filter routine 405 receives an identification of an ancestor window of the window 812a. In still even another embodiment, the window handler filter routine 405 receives an identification of a descendant window of the window 812a. In still another embodiment, the window handler filter routine 405 receives an identification of a sibling window of the window 812a. In another embodiment, the window handler filter routing 405 receives an identification of a type of class of the window. In yet another embodiment, the window handler filter routine 405 receives an identification of caption data displayed by the window. In some embodiments, the window handler filter routine 405 receives the window identification information from the client agent 220. In other embodiments, the window handler filter routine 405 uses an application programming interface to query an operating system executing on the computing device 200 for the window identification information.

The method includes determining whether a window handler routine executing on the computing device includes functionality for analyzing data displayed by the window associated with the first type of window (904). In one embodiment, the window handler filter routine 405 determines that the window handler routine 410 does provide functionality for analyzing data displayed by the window associated with the first type of window. In this embodiment, the window handler filter routine 405 may execute the window handler routine 410 to analyze displayed application output data 320. Alternatively, the window handler filter routine 405 may direct the client agent 220 to execute the window handler routine 410. In some embodiments, the window handler filter routine 405 determines that the window handler routine 410 does not include provide functionality for analyzing data displayed by the window associated with the first type of window. In one of these embodiments, the window handler filter routine 405 determines that none of a plurality of window handler routine 410 provide functionality for analyzing data displayed by the window associated with the first type of window; in such an embodiment, the window handler filter routine 405 may prevent operation on the window as described above in connection with FIGS. 4-7. In another of these embodiments, the window handler filter routine 405 determines that although none of a plurality of window handler routine 410 provide functionality for analyzing data displayed by the window associated with the first type of window, at least one window handler routine 410 provides functionality for analyzing data displayed by a window 812b of a second type and that the process for analyzing data of displayed by a window 812b of a second type may be applied to analyze data displayed by a window 812a of a first time.

The method includes directing the window handler routine to apply to the window associated with the first type of window a process for determining whether a window associated with a second type of window displays contact information (906). In one embodiment, the window handler routine 410 receives an instruction, from the client agent 220, to apply to the window associated with the first type of window a process for determining whether a window associated with a second type of window displays contact information. In another embodiment, the window handler routine 410 receives an instruction, from the window handler filter routine 405, to apply to the window associated with the first type of window a process for determining whether a window associated with a second type of window displays contact information.

In one embodiment, the window handler routine 410 determines, responsive to the applied process, that the window displays contact information to the user. In another embodiment, the window handler routine 410 determines, responsive to the applied process, that the window displays a telephone number to the user. In still another embodiment, the window handler routine 410 determines, responsive to the applied process, that the window displays a facsimile number to the user. In still even another embodiment, the window handler routine 410 determines, responsive to the applied process, that the window displays an email address to the user. In yet another embodiment, the window handler routine 410 determines, responsive to the applied process, that the window does not display contact information to the user. In some embodiments, the window handler routine 410 provides, to the client agent 220, an indication of whether the window 812a displays contact information 324 to the user. In other embodiments, and as described above in connection with FIGS. 3-7, if the client agent 220 receives an indication that the window 812 displays contact information 324 to the user, the client agent 220 generates and displays to a user at least one user interface displaying an interface element for initiating a telecommunications session based on identified contact information displayed by the window associated with the first type of window.

In some embodiments, the methods and systems described herein provide functionality for analyzing data displayed to a user of a computing device. In one of these embodiments, the methods and systems described herein provide this functionality even in situations in which the window handler routines 410 provided by the system do not include functionality for analyzing data displayed by a window of the type displaying the data for analysis. In another of these embodiments, by identifying an alternate window handler routine 410 for analyzing window data displayed in a window having a previously-unsupported type, the systems and methods described herein provide additional functionality and flexibility, supporting a wider range of types of windows displaying different types of data or data in differing formats without requiring the generation of customized software to analyze each of the different types of windows.

The methods and systems described above provide functionality for analyzing data generated by a resource executing in a first operating system and displayed by the first operating system. In some embodiments, however, the methods and systems described herein also provide functionality for analyzing data generated by a resource executing in a first operating system and displayed by a second operating system. In one of these embodiments, the methods and systems described herein include at least one interface providing mechanisms for communication between a first resource executing in the first operating system and a second resource executing in the second operating system.

Figure 10A:
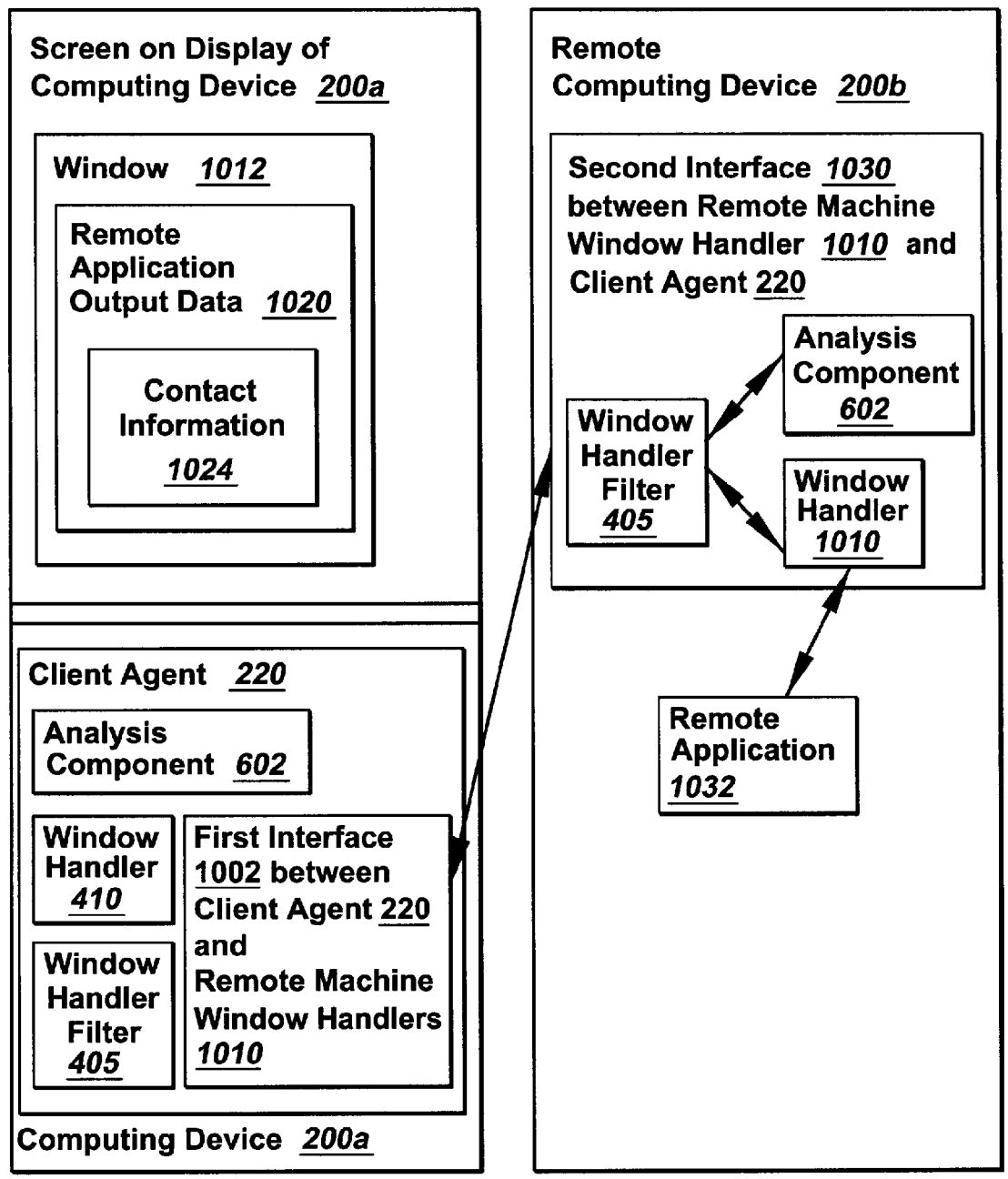
FIG. 10A is a block diagram depicting one embodiment of a system for providing, to a first application executed by a first operating system on a first computing device, an interface for communicating with at least one application executed by a second operating system on a second computing device.

Referring now to FIG. 10A, a block diagram depicts one embodiment of a system for providing, to a first application executed by a first operating system on a first computing device, an interface for communicating with at least one application executed by a second operating system on a second computing device. In brief overview, the system includes a computing device 200a, a computing device 200b, a first interface 1002 between a client agent 220 and at least one remote machine window handler routine 1010, an interface 1030 between the at least one remote machine window handler 1010 and the client agent 220, a remote application 1032, and a window 1012 displaying, on the computing device 200a, remotely-generated application output data 1020. The first interface object 1002, executed by a first operating system, provides a mechanism for external communication with a first application 220 executed by the first operating system, and receiving an identification of a window 1012 displayed by the first operating system and generated by a second application 1032 executed by a second operating system. The at least one remote machine window handler 1010 executed by the second operating system includes a receiver receiving a request from the first interface object 1002 via a second interface object 1030 executed by the second operating system and providing a mechanism for external communication with the at least one window handler routine 1010. The at least one remote machine window handler 1010 includes an analysis engine analyzing data displayed in the window 1012. The at least one remote machine window handler 1010 includes a transmitter sending to the first interface object 1002 via the second interface object 1030 an identification of contact information 1024 displayed by the window 1012.

Referring now to FIG. 10A, and in greater detail, the first interface object 1002 executed by a first operating system on a computing device 200a, provides a mechanism for external communication with a first application 220 executed by the first operating system, and receives an identification of a window 1012 displayed by the first operating system and generated by a second application 1032 executed by a second operating system on a second computing device 200b. In one embodiment, the first interface object 1002 is a proxy for a window handler routine 1010 executing on the computing device 200b. In another embodiment, the first interface object 1002 is a plug-in to the first application 220.

In one embodiment, the first application 220 is a client agent 220 or client software 220 as described above in connection with FIGS. 2-9. In another embodiment, the first application 220 interacts with the first interface object 1002 as if the first interface object 1002 were a window handler routine 410. In still another embodiment, the first interface object 1002 provides an interface between a client agent 220 executing on the computing device 200a and a window handler routine 1010 executing on the computing device 200b.

In some embodiments, the client agent 220 includes an analysis component, such as the parser 312 described above. In one of these embodiments, the analysis component confirms that data identified by the window handler routine 1010 is contact information. In another of these embodiments, the analysis component executes on the first operating system of the computing device 200a and is in communication with the first interface object 1002. In still another of these embodiments, the analysis component receives the contact information identified by the window handler routine 1010 and transmits, to the first application 220 confirmation that the data displayed by the identified window includes contact information. In yet another of these embodiments, the analysis component transmits to the first application 220 an indication that the data displayed by the identified window does not include contact information. In other embodiments, the first application 220 generates a user interface displaying the identified contact information 1024.

In one embodiment, the at least one window handler routine 1010 includes a receiver receiving a request from the first interface object via a second interface object. In another embodiment, the receiver receives an identification of a window 1012 displayed on the computing device 200a and generated by a remote application 1032 executing on the computing device 200b. In still another embodiment, the receiver receives a request to analyze application output data 1024 to determine whether or not the window 1012 displays any contact information 1024. In still even another embodiment, the at least one window handler routine 1010 includes an analysis engine analyzing application output data 1020 to determine whether the window 1012 displays any contact information 1024. The analysis engine may analyze the data to make the determination as described above in connection with FIGS. 4-9. In yet another embodiment, the at least one window handler routine 1010 sends, to the first interface object 1002, via the second interface object 1030, an identification of contact information 1024 displayed by the window 1012. In other embodiments, the at least one window handler routine 1010 sends, to the first interface object 1002, via the second interface object 1030, an indication that the window 1012 does not display contact information 1024.

In one embodiment, the at least one window handler routine 1010 executing on the computing device 200b provides functionality such as that provided by the window handler filter routine 405 described above in connection with FIGS. 3-9. In another embodiment, the at least one window handler routine 1010 is in communication with an analysis component executing on the computing device 200b and providing functionality such as that provided by the analysis component 602 described above. In still another embodiment, the at least one window handler routine 1010 executing on the computing device 200b is a plug-in module interacting with the second interface object 1030 as if the second interface object 1030 were a client agent 220. In still even another embodiment, the second interface object 1030 provides the at least one window handler routine 1010 with a mechanism for communicating with the client agent 220.

Figure 10B:
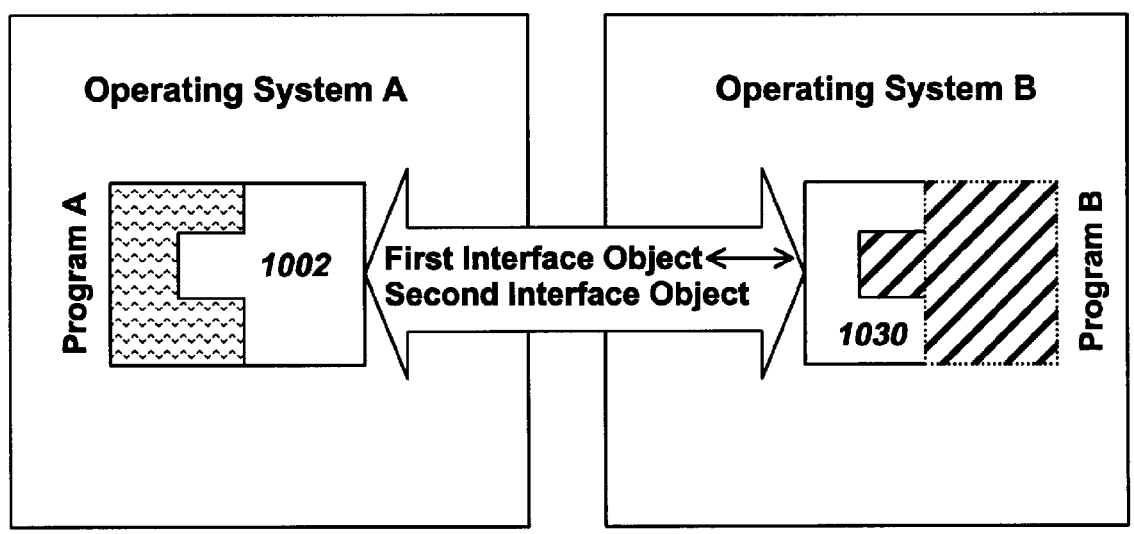
FIG. 10B is a block diagram depicting one embodiment of a plurality of interface objects providing communication mechanisms between an application executed by one operating system and at least one application executed by a second operating system.

Referring now to FIG. 10B, a block diagram depicts one embodiment of a system in which two interface objects provide mechanisms for external communication between a plurality applications. In one embodiment, the first interface object 1002 provides other objects, such as the second interface object 1030 and a second ("program B") executing on the second operating system B, with a mechanism for communicating with a first program ("program A") on the first operating system A. In another embodiment, the first interface object 1002 provides proxying functionality on behalf of the first program.

In some embodiments, the first interface object 1002 receives a request from program A—for example, for analysis of application output data 1024—and transmits the request to the second interface object 1030. In one of these embodiments, the second interface object 1030 transmits the request to one or more resources executing in the second operating system for processing. In another of these embodiments, the resources are window handler filters 1010 and the second interface object 1030 provides the functionality of a client agent 220, identifying at least one of a plurality of window handler filter 1010 to analyze data in an identified window, as described above in connection with FIGS. 4-9.

In one embodiment, program B generates data for transmission to program A, transmits the data to the second interface object 1030, which transmits the data to the first interface object 1002, which transmits the data to program A. In some embodiments, program B is unaware that the second interface object 1030 is not program A. In other embodiments, program A is unaware that the first interface object 1002 has not generated the data received by program A.

In some embodiments, the first interface object 1002 remains unaware of the resource (such as program B) or resources (such as a plurality of window handler routines 1010) that provide the processing of the request and interacts only with the second interface object 1030. In other embodiments, program A remains unaware that the first interface object 1002 did not process the request to generate the response or that resources executed by other operating systems (such as program B, or a plurality of window handler routines 1010). In still other embodiments, the program B remains unaware that the second interface object 1030 is not a client agent 220 or the originator of the request for processing. In further embodiments, a first resource is unaware that a second resource with which the first resource interacts is a proxy for a third resource because the second resource provides access to the same resources or functionality as the third resource.

In some embodiments, the first interface object 1002 and the second interface object 1030 establish a communications channel between the operating systems. In one of these embodiments, the first interface object 1002 and the second interface object 1030 communicate over a virtual channel. In another of these embodiments, the first interface object 1002 and the second interface object 1030 communicate over a channel according to a presentation layer protocol. In still another of these embodiments, a separate component establishes a presentation layer protocol channel such as a virtual channel and the first interface object 1002 and the second interface object 1030 communicate over the presentation layer protocol channel. In other embodiments, the first interface object 1002 and the second interface object 1030 communicate over any of the networks 114, 114', 108, 110, or 112 using any of the protocols described above in connection with FIGS. 1, 2A, and 2B.

Figure 10C:
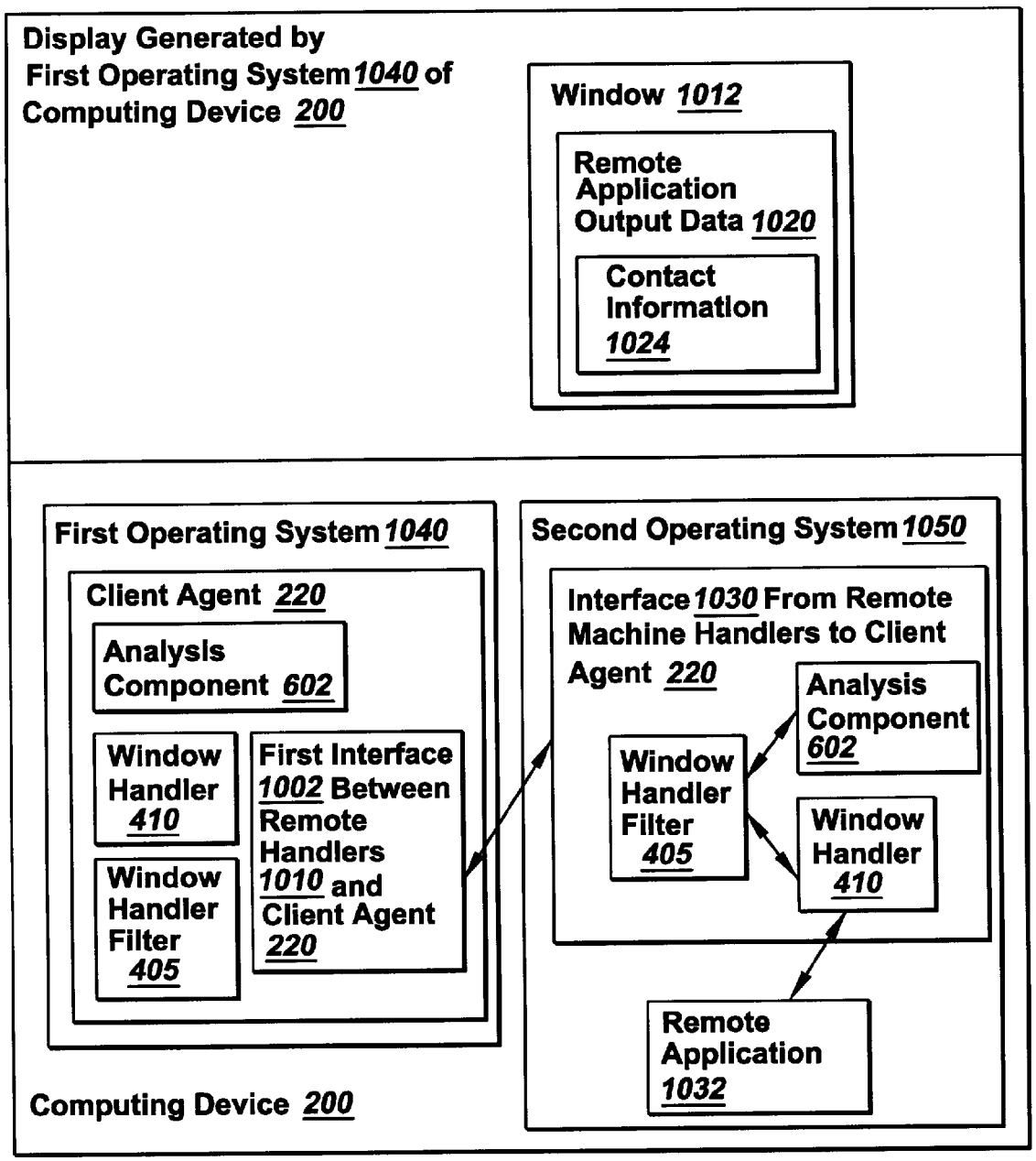
FIG. 10C is a block diagram depicting one embodiment of a system for providing, to a first application executed by a first operating system on a computing device, an interface for communicating with at least one application executed by a second operating system on the computing device.

Referring now to FIG. 10C, a block diagram depicts one embodiment of a system for providing, to a first application executed by a first operating system on a computing device, an interface for communicating with at least one application executed by a second operating system on the computing device. As described in connection with FIGS. 10A and 10B, the first interface object 1002 and the second interface object 1030 each execute in different operating systems and communicate across the operating systems to provide interfaces for two programs, such as a client agent 220 and a window handler routine 1010. Although depicted in FIG. 10A as executing on two different computing devices, in some embodiments, and as depicted in FIG. 10C, the first interface object 1002 and the second interface object 1030 may execute on different operating systems provided by a single computing device. The computing device 200 may execute both a first operating system 1040 and a second operating system 1050. In one embodiment, the first operating system 1040 is a different operating system than the second operating system 1050. In another embodiment, the first operating system 1040 is a different instance of the same operating system instantiated by the second operating system 1050. In still another embodiment, each of the operating systems 1040, 1050 execute within at least one virtual machine. For example, and in still another embodiment, a virtual machine 1060 may execute the first operating system 1040 and a second virtual machine 1070 may execute the second operating system 1050. In some embodiments, a hypervisor is provided to manage the virtual machines. In other embodiments, each of the operating systems 1040, 1050 is isolated from operating systems executing within a separate virtual machine.

In some embodiments, a user of the computing device 200 views a display of data generated by the first operating system 1040 separately from a display of data generated by the second operating system 1050. In one of these embodiments, for example, only one display device 224 is provided and the display device 224 displays only the output data generated by one of the operating systems executed by the computing device 100. In another of these embodiments, multiple display devices 224a-n are provided, each of which displays, separately, data generated by one of a plurality of operating systems. In other embodiments, a user of the computing device 200 views a display of data generated by the first operating system 1040 concurrently with a display of data generated by the second operating system 1050. In one of these embodiments, the user views a plurality of desktop environments on one or more display devices 224a-n providing a concurrent view of the plurality of desktop environments although the user interface elements and displayed data generated or maintained by each of the operating systems are displayed separately. In another of these embodiments, the user views a plurality of desktop environments on one or more display devices 224a-n providing a concurrent view of the plurality of desktop environments and the user interface elements and displayed data generated or maintained by each of the operating systems are displayed in an integrated desktop environment. In further embodiments, operating systems 1040 and 1050 executing on a single computing device 200 may share physical resources provided by the computing device 200 including, but not limited to, processing capabilities, physical disk space, and display devices.

In some embodiments, a resource executed in one operating system may generate output data for display within a second operating system. In one of these embodiments, and by way of example, an application 1032 executing in an operating system 1050 and remote to an operating system 1040—either physically or logically—may generate application output data for display in a window maintained by the operating system 1040. In another of these embodiments, the resource 1032 may transmit an agent executing on the output data to the operating system 1040, such as a presentation layer protocol client agent, and the agent directs the display of the output data by the operating system 1040.

Referring now to FIG. 11, a flow diagram depicts one embodiment of a method for providing, to a first application executed by a first operating system, an interface for communicating with at least one application executed by a second operating system. In brief overview, the method includes providing, by a first interface object executed by a first operating system, a mechanism for external communication with a first application executed by the first operating system (1102). The method includes providing, by a second interface object executed by a second operating system, a mechanism for external communication with at least one window handler routine executed by the second operating system (1104). The method includes receiving, by the first interface object, an identification of a window displayed by the first operating system and generated by a second application executed by the second operating system (1106). The method includes requesting, by the first interface object, from the second interface object, analysis of the identified window (1108). The method includes directing, by second interface object, analysis of data displayed in the window by the at least one window handler routine executed by the second operating system (1110). The method includes receiving, by the first interface object, from the second interface object, an identification of contact information displayed by the window resulting from the analysis by the at least one window handler routine executed by the second operating system (1112).

Referring now to FIG. 11, and in greater detail, the method includes providing, by a first interface object executed by a first operating system, a mechanism for external communication with a first application executed by the first operating system (1102). In one embodiment, the first interface object 1002 receives requests from the first application, such as the client agent 220, and forwards them to a second interface object 1030 for processing. In another embodiment, the first interface object 1002 receives information, including responses to request for analysis of output data, from the second interface object 1030 and provides the information to the client agent 220.

The method includes providing, by a second interface object executed by a second operating system, a mechanism for external communication with at least one window handler routine executed by the second operating system (1104). In one embodiment, the second interface object 1030 provides the functionality of a client agent 220 and a window handler routine 1010 on the second operating system interacts with the second interface object 1030 as described above in connection with FIGS. 3-9. In another embodiment, the window handler routine 1010 is a plug-in module that analyzes output data generated by applications executing on the second operating system 1050 and forwards a determination of whether or not the output data includes contact information to the second interface object 1030. As described above in connection with FIGS. 10A, 10B and 10C, and in one embodiment, the interface objects may establish a connection between operating systems over which the interface objects communicate, exchanging proxied requests and responses.

The method includes receiving, by the first interface object, an identification of a window displayed by the first operating system and generated by a second application executed by the second operating system (1106). In one embodiment, the client agent 220 identifies a window 1012 as described above in connection with FIGS. 3-9. In another embodiment, the client agent 220 interacts with the first interface object 1002 as if the first interface object 1002 were a window handler routine 410 in a plurality of window handlers 410. In still another embodiment, the client agent 220 transmits to the first interface object 1002 requests to indicate whether or not output data displayed by a window 1012 includes contact information. In some embodiments, the first interface object 1002 receives window identification information associated with a window 1012 and determines that the window 1012 displays output data generated by a resource executing on the second operating system 1050, which may execute on the second computing device 200.

The method includes requesting, by the first interface object, from the second interface object, analysis of the identified window (1108). In one embodiment, the first interface object 1002 analyzes the window identification information to identify an associated resource generating the output data 1020 as described above in connection with FIGS. 3-9. In another embodiment, the first interface object 1002 transmits the window identification information with a request for analysis of output data displayed by the window 1012 to the second interface object 1030 for processing.

The method includes directing, by second interface object, analysis of data displayed in the window by the at least one window handler routine executed by the second operating system (1110). In one embodiment, the second interface object 1030 receives a request from the first interface object 1002 and identifies at least one window handler routine 1010 providing functionality for processing the received request. In another embodiment, the second interface object 1030, implementing functionality such as that described above in connection with the client agent 220 and FIGS. 3-9, accesses a plurality of window handler routines 1010, each of which may have an associated level of priority, and requests that at least one of the window handler routines 1010 analyze output data 1020. In some embodiments, the second interface object 1030 transmits the received request to a non-window handler application.

The method includes receiving, by the first interface object, from the second interface object, an identification of contact information displayed by the window resulting from the analysis by the at least one window handler routine executed by the second operating system (1112). In one embodiment, the client agent 220 displays a user interface for interacting with the identified contact information, responsive to receiving the identification of the contact information from the first interface object. In another embodiment, the first interface object 1002 transmits the identification of contact information 1024 to the client agent 220. In still another embodiment, the first interface object 1002 receives, from the second interface object 1030, an indication that the window does not display contact information, responsive to the analysis by the at least one window handler routine.

In some embodiments, the first interface object 1002 transmits the identification of contact information 1024 to an analysis component, such as parser 312, for confirmation that the identified data is contact information. In one of these embodiments, the analysis component determines that the identified information does not include a telephone number. In another of these embodiments, the analysis component determines that the identified information does not include a facsimile number. In still another of these embodiments, the analysis component determines that the identified information does not include contact information. In still even another of these embodiments, the analysis component transmits an identification to the client agent 220 that the identified information is not contact information. In yet another of these embodiments, the analysis component transmits an instruction to the client agent 220 not to display a user interface for interacting with the identified contact information.

In some embodiments, the methods and systems described herein provide functionality for allowing a client software 220 executed by one operating system to interact with a window handler routine 1010, or other application, executed by a second operating system either on the same or a different computing device, to determine whether remotely-generated output data includes contact information. In one of these embodiments, by allowing the local client software 220 to request analysis of output data generated by applications executing in an environment remote from the client software 220, the methods and systems described herein improve the functionality of the client software 220 to include the ability to analyze data from output data regardless of the environment in which the resource generating the output data executes, without requiring the execution of additional client software in the local environment.

It should be understood that the systems described above may provide multiple ones of any or each of those components and these components may be provided on either a standalone machine or, in some embodiments, on multiple machines in a distributed system. In some embodiments, computer readable media are provided having instructions thereon that when executed provide the methods and systems described above. In addition, the systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for providing, to a first application executed by a first operating system, an interface for communicating with at least one application executed by a second operating system, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for providing, to a first application executed by a first operating system, an interface for communicating with at least one application executed by a second operating system, the method comprising:

providing, by a first interface object executed by a first operating system, a mechanism for external communication with a first application executed by the first operating system;

providing, by a second interface object executed by a second operating system, a mechanism for external communication with at least one window handler routine executed by the second operating system of a plurality of window handler routines with an associated level of priority, wherein the associated level of priority determines an order in which each of the plurality of window handler routines is executed;

receiving, by the first interface object, identification information of a window displayed by the first operating system and generated by a second application executed by the second operating system;

requesting, by the first interface object responsive to determining from analysis of the identification information that the window corresponds to a predetermined type of window within a list of window types, from the second interface object, analysis of the window to determine whether application output data generated by the second application executed by the second operating system and displayed in the window of the first operation system comprises contact information;

determining, by the plurality of window routines, the at least one window routine to process the application output data based on the identification information, wherein each of the plurality of window routines determines whether or not that window routine may process the application data and passes the identification information to a subsequent window routine until a window routine is identified;

directing, by the second interface object, analysis of data displayed in the window to the at least one window handler routine executed by the second operating system and accessed based on the at least one window handler routine's level of priority; and receiving, by the first interface object, from the second interface object, an identification of contact information displayed by the window resulting from the analysis by the at least one window handler routine executed by the second operating system.

2. The method of claim 1 further comprising displaying, by the first application, a user interface for interacting with the identified contact information, responsive to receiving the identification of the contact information from the first interface object.

3. The method of claim 1 further comprising transmitting, by the first interface object to an analysis component executed by the first operating system and in communication with the first application, the contact information received from the second interface object.

4. The method of claim 3, further comprising determining, by the analysis component, that the contact information does not comprise a telephone number.

5. The method of claim 1, wherein the identification information comprises one of a process id, a window class id and a top level id.

6. The method of claim 1, wherein the list of window types comprises a browser window, a window field, and a parent window.

7. The method of claim 1 further comprising receiving, by the first interface object, from the second interface object, an indication that the window does not display contact information, responsive to the analysis by the at least one window handler routine.

8. A system for providing, to a first application executed by a first operating system, an interface for communicating with at least one application executed by a second operating system, comprising:

a processor;

a first interface object executed on the processor by a first operating system, providing a mechanism for external communication with a first application executed by the first operating system, and receiving identification information of a window displayed by the first operating system and generated by a second application executed by a second operating system;

a plurality of window routines to determine at least one window routine to process application output data generated by the second operating system and displayed in the window of the first operating system based on the identification information, wherein each of the plurality of window routines determines whether or not that window routine may process the application data and passes the identification information to a subsequent window routine until a window routine is identified; and the at least one window handler routine executed by the second operating system of the plurality of window handler routines with an associated level of priority, wherein the associated level of priority determines an order in which each of the plurality of window handler routines is executed; and comprising:

i) a receiver receiving a request from the first interface object to determine whether the application output data generated by the second operating system and displayed in the window of the first operation system comprises contact information, responsive to the first interface object determining from analysis of the identification information that the window corresponds to a predetermined type of window within a list of window types, via a second interface object executed by the second operating system and providing a mechanism for external communication with the at least one window handler routine accessed based on the at least one window handler routine's level of priority;

ii) an analysis engine analyzing data displayed in the window, and iii) a transmitter sending to the first interface object via the second interface object an identification of contact information displayed by the window.

9. The system of claim 8, wherein the list of window types comprises a browser window, a window field, and a parent window and wherein the identification information comprises one of a process id, a window class id and a top level id.

10. The system of claim 8, wherein the at least one window handler routine further comprises a plug-in module communicating with the second interface object.

11. The system of claim 8 further comprising a user interface generated by the first application and displaying the identified contact information.

12. The system of claim 8 further comprising an analysis component, executed by the first operating system, in communication with the first application and with the first interface object, receiving the contact information, and transmitting to the first application confirmation that the data displayed by the identified window includes contact information.

13. The system of claim 8 further comprising an analysis component, executed by the first operating system, in communication with the first application and with the first interface object, receiving the contact information, and transmitting to the first application an indication that the data displayed by the identified window does not include contact information.

14. A computer readable medium comprising a non-transitory medium and having instructions thereon that when executed provide a method for providing, to a first application executed by a first operating system, an interface for communicating with at least one application executed by a second operating system, the computer readable medium comprising:

instructions to provide, by a first interface object executed by a first operating system, a mechanism for external communication with a first application executed by the first operating system;

instructions to provide, by a second interface object executed by a second operating system, a mechanism for external communication with at least one window handler routine executed by the second operating system of a plurality of window handler routines with an associated level of priority, wherein the associated level of priority determines an order in which each of the plurality of window handler routines is executed;

instructions to receive, by the first interface object, an identification information of a window displayed by the first operating system and generated by a second application executed by the second operating system;

instructions to request, by the first interface object responsive to determining from analysis of the identification information that the window corresponds to a predetermined type of window within a list of window types, from the second interface object, analysis of the window to determine whether application output data generated by the second operating system and displayed in the window of the first operation system comprises contact information;

instructions to determine, by the plurality of window routines, the at least one window routine to process the application output data based on the identification information, wherein each of the plurality of window routines determines whether or not that window routine may process the application data and passes the identification information to a subsequent window routine until a window routine is identified;

instructions to direct, by the second interface object, analysis of data displayed in the window by the at least one window handler routine accessed based on the at least one window handler routine's level of priority; and instructions to receive, by the first interface object, from the second interface object, an identification of contact information displayed by the window resulting from the analysis by the at least one window handler routine.

15. The computer readable medium of claim 14 further comprising instructions to display, by the first application, a user interface for interacting with the identified contact information, responsive to receiving the identification of the contact information from the first interface object.

16. The computer readable medium of claim 14 further comprising instructions to transmit, by the first interface object to an analysis component executed by the first operating system and in communication with the first application, the contact information.

17. The computer readable medium of claim 15 further comprising instructions to determine, by the analysis component, that the contact information does not comprise a telephone number.

18. The computer readable medium of claim 15, wherein the list of window types comprises a browser window, a window field, and a parent window and wherein the identification information comprises one of a process id, a window class id and a top level id.

19. The computer readable medium of claim 15 further comprising instructions to transmit, by the analysis component, to the first application, an instruction not to display a user interface for interacting with the identified contact information.

20. The computer readable medium of claim 14 further comprising instructions to receive, by the first interface object, from the second interface object, an indication that the window does not display contact information, responsive to the analysis by the at least one window handler routine.

* * * * *